(12) United States Patent
Stroud et al.

(10) Patent No.: US 12,409,501 B2
(45) Date of Patent: Sep. 9, 2025

(54) GUIDE DRESSER, CUTTER HEADS AND METHODS OF USE THEREOF

(71) Applicant: SIMONDS INTERNATIONAL L.L.C., Woodland, WA (US)

(72) Inventors: Gary Stroud, West Kelowna (CA); Vincent Bergeron, Prince George (CA)

(73) Assignee: SIMONDS INTERNATIONAL L.L.C., Woodland, WA (US)

( * ) Notice: Subject to any disclaimer, the term of this patent is extended or adjusted under 35 U.S.C. 154(b) by 488 days.

(21) Appl. No.: 17/748,278

(22) Filed: May 19, 2022

(65) Prior Publication Data
US 2023/0150042 A1 May 18, 2023

Related U.S. Application Data

(63) Continuation-in-part of application No. 17/528,804, filed on Nov. 17, 2021.

(51) Int. Cl.
*B23C 1/04* (2006.01)
*B23C 1/12* (2006.01)
(Continued)

(52) U.S. Cl.
CPC ............... *B23C 1/045* (2013.01); *B23C 1/12* (2013.01); *B23C 3/13* (2013.01); *B23Q 15/24* (2013.01);
(Continued)

(58) Field of Classification Search
CPC ....... B23C 1/045; B23C 3/13; B23C 2260/56; B23C 1/04; Y10T 409/307168; Y10T 409/306944; Y10T 409/306832; Y10T 409/307244; Y10T 409/307336; Y10T 409/308088; Y10T 409/307784; Y10T 409/308344; Y10T 409/308568; B23Q 39/026; B23Q 39/025; B23Q 2717/006; B23Q 17/20–22; B23Q 17/2233;
(Continued)

(56) References Cited

U.S. PATENT DOCUMENTS 1,402,998 A    1/1922  Anderson
1,904,649 A *  4/1933  Nenninger ............. B23C 1/045
                                                    409/151

(Continued)

FOREIGN PATENT DOCUMENTS

CA    2773792 C    8/2013
CA    3042072 C    8/2020
(Continued)

OTHER PUBLICATIONS

Machine Translation of CN 104759667 A, which CN '667 was published Jul. 2015.*
(Continued)

*Primary Examiner* — Erica E Cadugan
(74) *Attorney, Agent, or Firm* — Schwabe, Williamson & Wyatt, P.C.

(57) ABSTRACT

There is provided a guide dresser for milling a saw guide, the guide dresser comprising first and second cutter assemblies that are slidably mounted on a rail or slide system so as to be adjustable, in operation, between an open position and a closed position. There is also provided cutter heads and methods for milling a saw guide.

20 Claims, 15 Drawing Sheets

(51) Int. Cl.
*B23C 3/13* (2006.01)
*B23Q 15/24* (2006.01)
*B23Q 17/22* (2006.01)
*B23Q 17/24* (2006.01)
*B23Q 39/02* (2006.01)
B23D 63/00 (2006.01)
B23Q 39/00 (2006.01)

(52) U.S. Cl.
CPC ..... *B23Q 17/2283* (2013.01); *B23Q 17/2414* (2013.01); *B23Q 39/026* (2013.01); *B23C 2260/56* (2013.01); *B23D 63/00* (2013.01); *B23Q 2039/002* (2013.01); *B23Q 2717/006* (2013.01); *Y10T 409/303752* (2015.01); *Y10T 409/3042* (2015.01); *Y10T 409/306944* (2015.01); *Y10T 409/307168* (2015.01); *Y10T 409/307672* (2015.01); *Y10T 409/308512* (2015.01)

(58) Field of Classification Search
CPC ................ B23Q 17/2283; B23Q 17/24; B23Q 17/2414–2419; B23Q 17/2428–2433; B23Q 17/2447
USPC ....... 409/192, 188, 186, 193, 195, 207, 203, 409/213, 217
See application file for complete search history.

(56) References Cited

U.S. PATENT DOCUMENTS

| | | | |
|---|---|---|---|
| 2,559,839 A * | 7/1951 | Andrew | B23C 1/045 409/192 |
| 3,361,410 A | 1/1968 | Messer | |
| 3,645,304 A | 2/1972 | Thrasher | |
| 3,823,627 A | 7/1974 | Scharfen | |
| 3,920,296 A | 11/1975 | Eckhardt | |
| 4,175,804 A | 11/1979 | Pannwitz | |
| 4,208,156 A | 6/1980 | Kralowetz et al. | |
| 4,326,323 A | 4/1982 | Kralowetz et al. | |
| 4,575,034 A | 3/1986 | Tobey | |
| 4,576,357 A | 3/1986 | Schrepfer | |
| 4,619,565 A | 10/1986 | Schmid et al. | |
| 4,712,953 A * | 12/1987 | Witzel | B23Q 15/22 409/208 |
| 4,840,409 A | 6/1989 | Welkey | |
| 5,050,913 A | 9/1991 | Lenz | |
| 5,080,319 A | 1/1992 | Nielsen | |
| 5,096,346 A * | 3/1992 | Ueda | B23C 3/12 409/218 |
| 5,149,147 A | 9/1992 | Kastrup et al. | |
| 5,159,866 A | 11/1992 | Dunham | |
| 5,809,859 A | 9/1998 | Stroud et al. | |
| 5,921,162 A | 7/1999 | Jackson et al. | |
| 5,921,729 A | 7/1999 | Kikuchi et al. | |
| 5,971,350 A | 10/1999 | Mccutcheon | |
| 6,068,234 A | 5/2000 | Keus | |
| 6,138,979 A | 10/2000 | Morman | |
| 6,230,600 B1 | 5/2001 | Stroud | |
| 6,322,300 B1 | 11/2001 | Santorius et al. | |
| 6,506,004 B1 | 1/2003 | Kohlhase et al. | |
| 6,631,771 B2 | 10/2003 | Hamamura et al. | |
| 6,705,188 B2 | 3/2004 | Gravely et al. | |
| 6,729,212 B2 | 5/2004 | Muller | |
| 6,773,204 B1 * | 8/2004 | Emter | B23C 3/00 409/145 |
| 6,877,411 B2 | 4/2005 | Mcgehee et al. | |
| 6,938,872 B2 | 9/2005 | Nygaard | |
| 6,973,861 B2 | 12/2005 | Shimomura | |
| 7,179,029 B2 | 2/2007 | Hemming et al. | |
| 7,490,868 B2 | 2/2009 | Prestridge | |
| 7,717,395 B2 | 5/2010 | Rowan et al. | |
| 9,199,320 B2 | 12/2015 | Stroud | |
| 9,296,082 B1 | 3/2016 | Kesvanathan et al. | |
| 10,267,450 B2 | 4/2019 | Stroud | |
| 2002/0008187 A1 | 1/2002 | Ganter | |
| 2019/0337064 A1 | 11/2019 | Stroud et al. | |
| 2024/0293880 A1 * | 9/2024 | Bergen | B23C 1/045 |

FOREIGN PATENT DOCUMENTS

| | | | |
|---|---|---|---|
| CN | 104759667 A * | 7/2015 | |
| CN | 106270669 A * | 1/2017 | |
| CN | 211916133 U | 11/2020 | |
| CN | 114211026 A * | 3/2022 | |
| DE | 3505503 A1 * | 8/1986 | |
| DE | 3815690 A1 | 11/1989 | |
| DE | 4015198 A1 | 11/1991 | |
| JP | 55-150907 A * | 11/1980 | |
| WO | 03091618 A1 | 11/2003 | |

OTHER PUBLICATIONS

Canadian Patent Office—Examiner's Report mailed Jun. 13, 2024, from CA Patent Application No. 3,154,873, 3 pages.
United States Patent Office—Office Action mailed Jul. 1, 2024, from U.S. Appl. No. 17/528,804, 9 pages.
Canadian Patent Office- Examiner's Report mailed Mar. 15, 2022, from CA Patent Application No. 3,139,420, 3 pages.
CA Office Action for Application No. 3154873; mailed Jun. 12, 2023; 4 pages.
United States Patent Office—Final Office Action mailed Feb. 13, 2025, from U.S. Appl. No. 17/528,804, 12 pages.

* cited by examiner

Guide Dresser in which Each of Laser Range Finders is Aligned to Measure the Saw Guide From a Different Angle

FIG. 10

GUIDE DRESSER, CUTTER HEADS AND METHODS OF USE THEREOF

CROSS REFERENCE TO RELATED APPLICATIONS

This application is a continuation-in-part of U.S. patent application Ser. No. 17/528,804 filed on Nov. 17, 2021, the entire disclosure of which is hereby incorporated by reference.

TECHNICAL FIELD

The present disclosure generally relates to a guide dresser, cutter heads and methods of use thereof, and more particularly to automated guide dressers having movable cutter assemblies for milling a saw guide.

BACKGROUND

Production of lumber from raw logs typically involves a first step, called primary breakdown, which involves recovering an elongate square center from a log using head rig equipment. Head rigs generally comprise a large stationary circular saw or a band saw and a travelling carriage. The travelling carriage rotationally transports a log back and forth through the head rig to remove a series of rounded slabs from outer edges of the log thereby producing the squared center of the log, which is commonly called a "cant". In some processes, cants are produced with two squared-off opposing sides. Primary breakdown typically produces 2-sided and 4-sided cants, rounded edge slabs, and sometimes, large boards.

The cants, slabs and boards produced during primary breakdown are further processed during secondary breakdown processes whereby large rectangular side flitches having two opposing parallel sides, are cut from the sides of cants with band saws or circular saws. Flitches are then typically broken down into functional lumber with equipment having multiple parallel circular saw blades mounted onto a fixed driven arbor, commonly known as circular gang saws. The processing step for producing flitches from cants is known as "reducing" while production of functional lumber from flitches comprises multiple steps referred to as "edging" and "re-sawing". High volume throughput systems often combine the reducing and edging steps into one piece of equipment operating under high saw speeds to enable rapid cutting of wood against high pressures forced by rapid throughput of cants and flitches.

Pressing forces applied by high volume throughput of flitches and lumber pieces against circular gang saws often cause undesired lateral movements and vibrations of individual saw blades resulting in deterioration in blade stability and reduced dimensional accuracy in the final finished lumber pieces. It is common practice to provide saw guides interposed between individual blades to maintain their spacing and to minimize the extent of vibration that may occur. The saw guides are securely fixed into place between the individual circular blades by engagement with equipment frame rails or other support elements to provide stability to the saw blades prior to commencing operations.

Accurate saw guides improve the performance of the saws (e.g., gang saws) in the production of lumber. In this regard, guide dressers have been developed to mill and machine saw guides to improve and maintain their longevity and accuracy. However, existing guide dressers and cutter heads are not accurate enough to maintain saw guides within desired tolerances. Also, existing guide dressers and cutters are difficult to set properly and require significant manual operation.

A need therefore exists for an improved guide dresser and cutter heads that exhibit ease of use and a high degree of accuracy in milling and machining saw guides.

SUMMARY

The present disclosure provides guide dressers, cutter heads and methods for milling or machining a saw guide. The present disclosure recognizes that there are problems in the current existing guide dresser technologies in respect of the apparatus, cutter heads and methods, and provides an improved guide dresser and cutter heads.

An advantage of the present disclosure is the provision of guide dressers and components thereof (e.g., cutter assemblies, cutter heads, etc.) having improved characteristics over existing technologies, tools, processes and systems.

In an embodiment, the present disclosure relates to a guide dresser for milling a saw guide, the guide dresser comprising: a rail or slide system; a first cutter assembly slidably mounted on the rail or slide system, the first cutter assembly having a first rotatable cutter head; a second cutter assembly slidably mounted on the rail or slide system, the second cutter assembly having a second rotatable cutter head; and a guide mount for receiving and maintaining in a stationary position a saw guide, the stationary position being between the first rotatable cutter head and the second rotatable cutter head and the rail or slide system aligned for moving each of the first cutter assembly and second cutter assembly towards or away from the guide mount, the guide dresser being adjustable between an open position and a closed position by slidable movement of the first cutter assembly, the second cutter assembly, or both, wherein: when in the open position, one or both of the first cutter assembly and the second cutter assembly are positioned away from the guide mount on the rail system, and when in the closed position, both the first cutter assembly and the second cutter assembly are positioned proximal to the guide mount on the rail system, such that both the first cutter head and second cutter head are capable of contacting the saw guide when it is received within the guide mount.

In an embodiment, the present disclosure relates to a method for milling a saw guide, the method comprising: moving a first cutter assembly and a second cutter assembly on a rail or slide system to engage a first cutter head of the first cutter assembly and a second cutter head of the second cutter assembly against opposing sides of a stationary saw guide; and milling or machining the stationary saw guide.

In an embodiment, the present disclosure relates to a cutter head, the cutter head comprising a circular disc and one or more removable knife retention apparatuses, each of the one or more removable knife retention apparatuses for receiving a knife.

In an embodiment, the present disclosure relates to a cutter head, the cutter head comprising a circular disc having two or more grooves on a face thereof, each groove of the two or more grooves for receiving two or more cutting implements.

In an embodiment, the present disclosure relates to a kit comprising one or more components of the cutter heads described herein. For example, in an embodiment, the present disclosure relates to a kit comprising a circular disc for use as a cutter head, and one or more removable knife retention apparatuses. The kit may further comprise one or more knives for mounting in each of the removable knife retention apparatuses. In another embodiment, the kit may comprise a circular disc having two or more grooves on a face thereof for use as a cutter head, and two or more cutting implements.

Further advantageous aspects of the present disclosure include the provision of automated guide dressers and methods for automated milling of a saw guide.

In an embodiment, the present disclosure relates to a guide dresser for milling a saw guide, the guide dresser comprising: a rail or slide system; a first cutter assembly slidably mounted on the rail or slide system, the first cutter assembly having a first rotatable cutter head; a second cutter assembly slidably mounted on the rail or slide system, the second cutter assembly having a second rotatable cutter head; a guide mount for receiving and maintaining in a stationary position a saw guide, the stationary position being between the first rotatable cutter head and the second rotatable cutter head and the rail or slide system aligned for moving each of the first cutter assembly and second cutter assembly towards or away from the guide mount, and one or more laser range finders positioned and aligned to take a measurement of the saw guide when the saw guide is positioned in the guide mount, the guide dresser being automatically adjustable between an open position and a closed position by slidable movement of the first cutter assembly, the second cutter assembly, or both, wherein: when in the open position, both the first cutter assembly and the second cutter assembly are positioned away from the guide mount on the rail system, and when in the closed position, both the first cutter assembly and the second cutter assembly are positioned proximal to the guide mount on the rail system, such that both the first cutter head and second cutter head are capable of contacting the saw guide when it is received within the guide mount, wherein the slidable movement between the open position and the closed position is in whole or in part an automatic operation based on results of the measurement of the one or more laser range finders.

In an embodiment, the present disclosure relates to a method for automated milling of a saw guide, the method comprising: providing a saw guide to the guide mount of the guide dresser of the present disclosure; activating the one or more laser range finders to acquire measurements of the saw guide; triggering automated operation of the guide dresser to move the first cutter assembly and the second cutter assembly on the rail or slide system to engage the first cutter head of the first cutter assembly and the second cutter head of the second cutter assembly against opposing sides of the saw guide; and milling or machining the saw guide to provide a milled saw guide.

Other aspects and embodiments of the disclosure are evident in view of the detailed description provided herein.

BRIEF DESCRIPTION OF THE DRAWINGS

Further advantages, permutations and combinations of the invention will now appear from the above and from the following detailed description of the various particular embodiments of the invention taken together with the accompanying drawings, each of which are intended to be non limiting, in which:

FIG. 10 schematically depicts an alternative arrangement of the laser range finders.

DETAILED DESCRIPTION

Figure 1A:
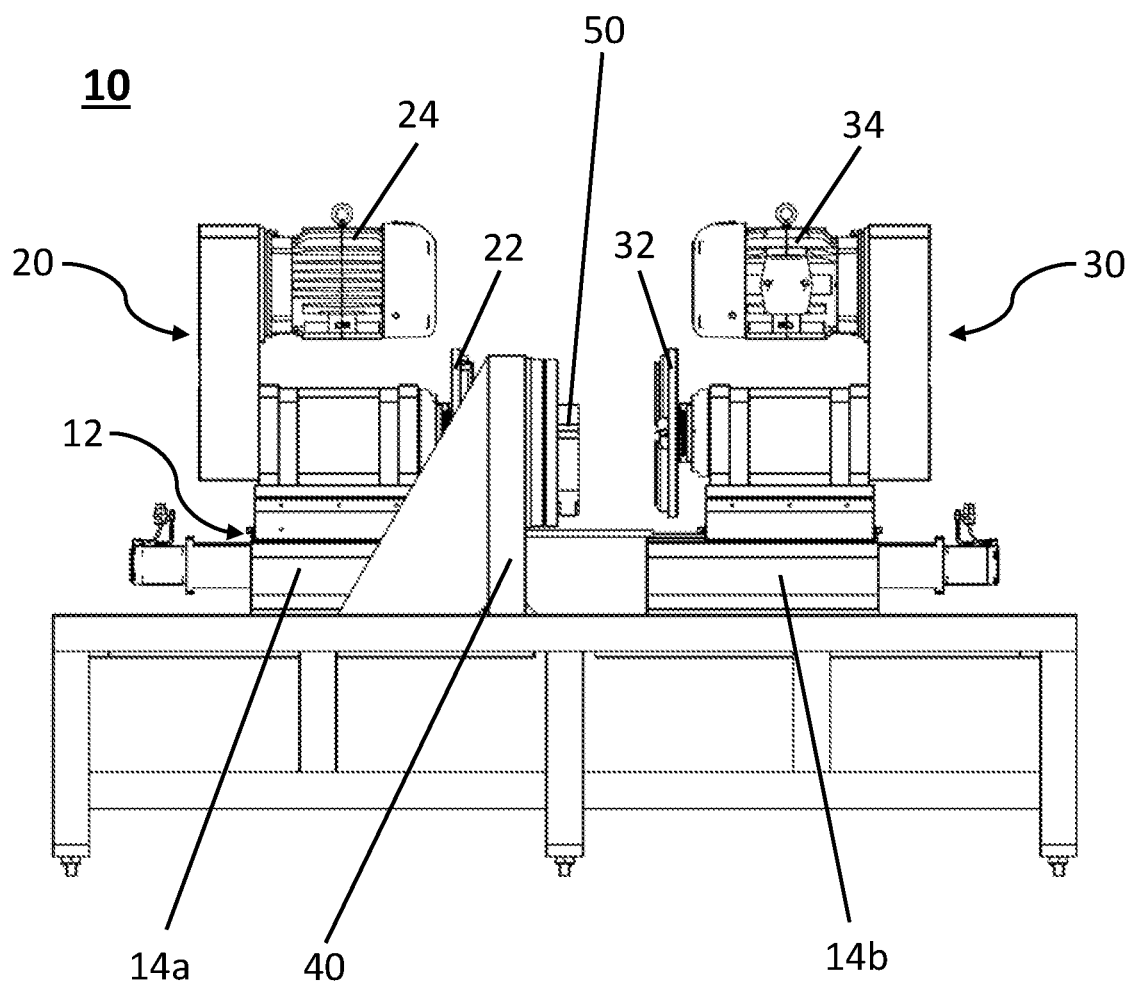
FIG. 1A is a side view of a guide dresser according to some embodiments of the present disclosure, showing the guide dresser in an open position.
Figure 1B:
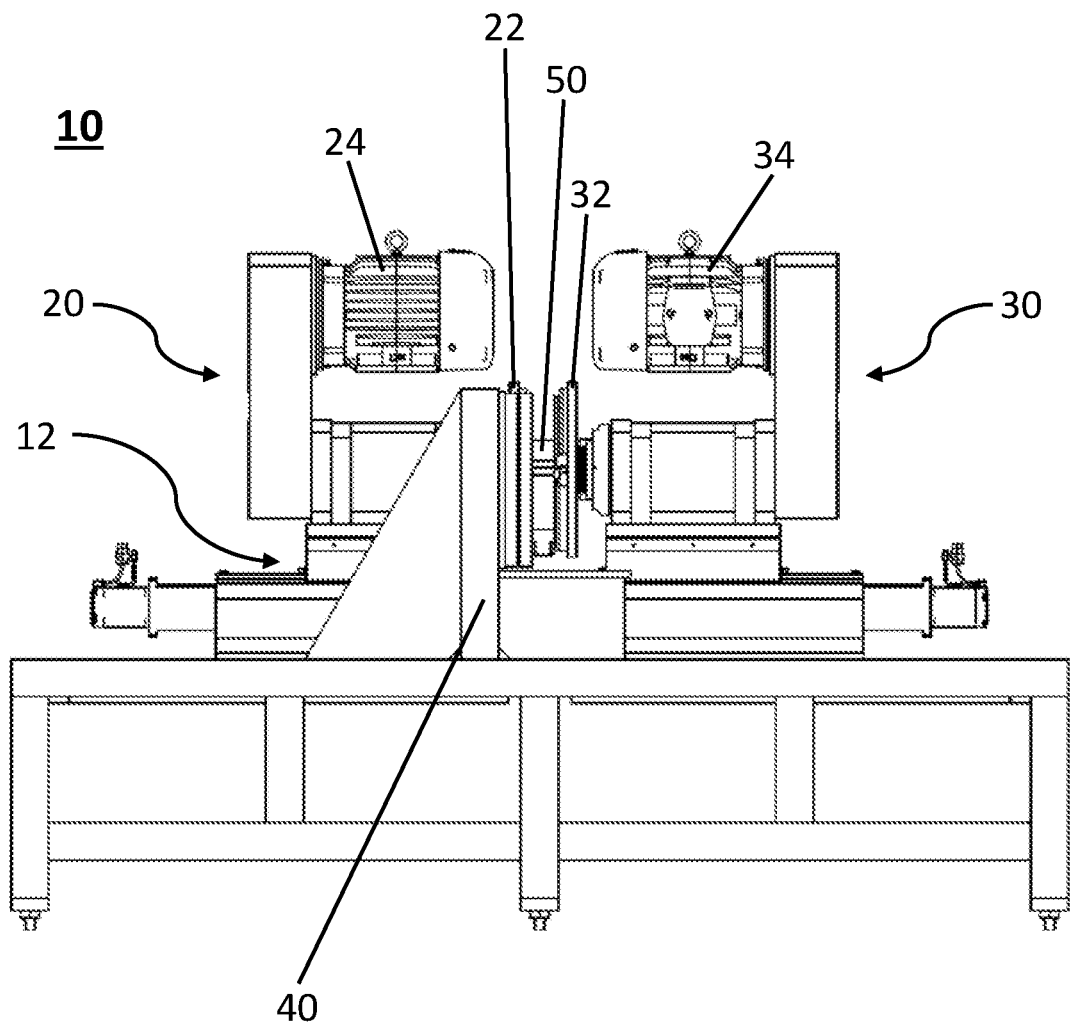
FIG. 1B is a side view of a guide dresser according to some embodiments of the present disclosure, showing the guide dresser in a closed position.
Figure 2A:
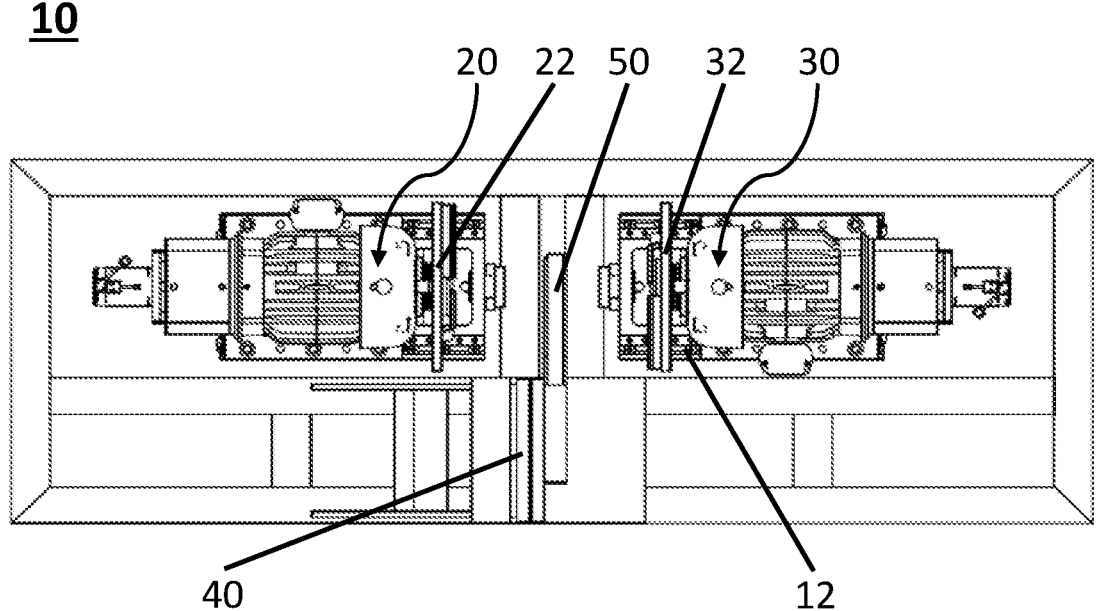
FIG. 2A is a top view of the guide dresser shown in FIG. 1A, showing the guide dresser in the open position.
Figure 2B:
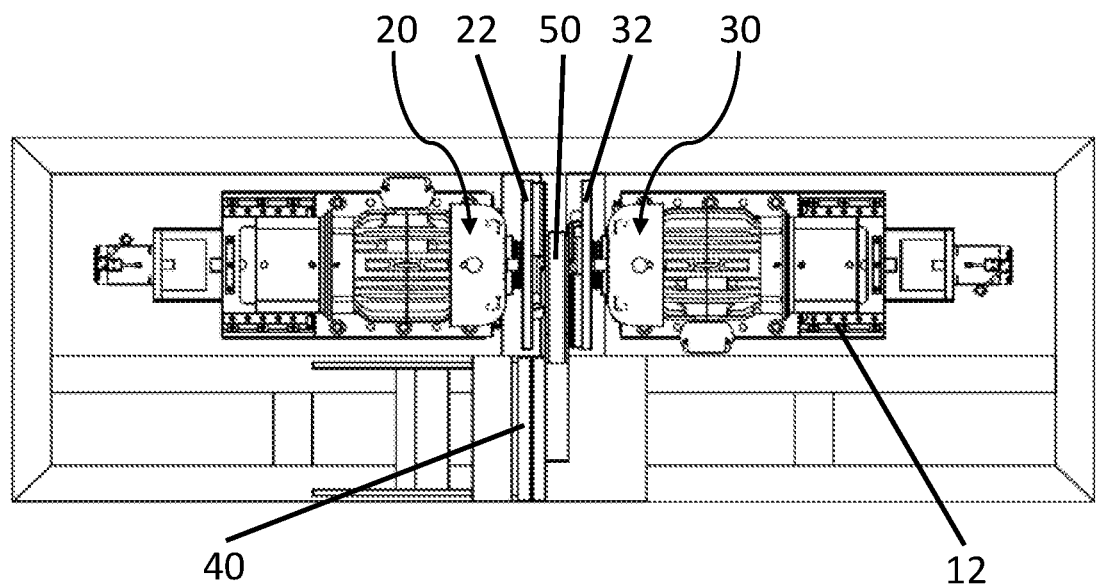
FIG. 2B is a top view of the guide dresser shown in FIG. 2A, showing the guide dresser in the closed position.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the suitable methods and materials are described below.

The embodiments of the present disclosure pertain to guide dressers, cutter heads and methods having improved functionality for milling and machining saw guides. Guide dressers of the present disclosure have moveable cutter assemblies for engaging and disengaging a saw guide. In select embodiments, cutter assemblies are slidably mounted on a rail or slide system so as to be adjustable between an open position and a closed position. Cutter heads of the present disclosure have unique features and configurations for improved milling of a saw guide.

The present disclosure provides a number of advantages over existing technologies. For example, existing guide dressers are not accurate enough and are difficult to set properly. This is due to a number of factors, including for example the saw guide being fed into the cutters. Moreover, existing cutter heads are often set in position by hand and are rarely capable of milling a saw guide to desired or even acceptable tolerances.

An advantage of the present disclosure is the provision of guide dressers having improved characteristics over existing technologies, in particular having fewer moving parts and using a configuration by which improved cutter heads are moved directly into a saw guide for milling and machining operations. In the guide dressers of the present disclosure, the saw guide remains stationary, and the cutter heads are fed into the saw guide on slidably mounted cutter assemblies. In certain embodiments, the process is automated. For example, in certain embodiments of the present disclosure one or more laser range finders may be employed for automated movement and/or programming of the cutter assemblies. In some embodiments, the cutter heads on respective cutter assemblies are fed into the saw guide using programmable computer numerical control (CNC) programming.

In some embodiments, the present disclosure relates to a guide dresser for milling a saw guide, the guide dresser comprising: a rail or slide system; a first cutter assembly slidably mounted on the rail or slide system, the first cutter assembly having a first rotatable cutter head; a second cutter assembly slidably mounted on the rail or slide system, the second cutter assembly having a second rotatable cutter head; and a guide mount for receiving and maintaining in a stationary position a saw guide, the stationary position being between the first rotatable cutter head and the second rotatable cutter head and the rail or slide system aligned for moving each of the first cutter assembly and second cutter assembly towards or away from the guide mount, the guide dresser being adjustable between an open position and a closed position by slidable movement of the first cutter assembly, the second cutter assembly, or both, wherein: when in the open position, one or both of the first cutter assembly and the second cutter assembly are positioned away from the guide mount on the rail system, and when in the closed position, both the first cutter assembly and the second cutter assembly are positioned proximal to the guide mount on the rail system, such that both the first cutter head and second cutter head are capable of contacting the saw guide when it is received within the guide mount.

In some embodiments, the guide dresser may further comprise one or more laser range finders positioned and aligned to take a measurement of the saw guide when the saw guide is positioned in the guide mount. In such embodiments, movement of the cutter assemblies may be automated such that the slidable movement between the open position and the closed position is in whole or in part an automatic operation based on results of the measurement of the one or more laser range finders.

Thus, in another embodiment, the present disclosure relates to a guide dresser for milling a saw guide, the guide dresser comprising: a rail or slide system; a first cutter assembly slidably mounted on the rail or slide system, the first cutter assembly having a first rotatable cutter head; a second cutter assembly slidably mounted on the rail or slide system, the second cutter assembly having a second rotatable cutter head; a guide mount for receiving and maintaining in a stationary position a saw guide, the stationary position being between the first rotatable cutter head and the second rotatable cutter head and the rail or slide system aligned for moving each of the first cutter assembly and second cutter assembly towards or away from the guide mount, and one or more laser range finders positioned and aligned to take a measurement of the saw guide when the saw guide is positioned in the guide mount, the guide dresser being automatically adjustable between an open position and a closed position by slidable movement of the first cutter assembly, the second cutter assembly, or both, wherein: when in the open position, both the first cutter assembly and the second cutter assembly are positioned away from the guide mount on the rail system, and when in the closed position, both the first cutter assembly and the second cutter assembly are positioned proximal to the guide mount on the rail system, such that both the first cutter head and second cutter head are capable of contacting the saw guide when it is received within the guide mount, wherein the slidable movement between the open position and the closed position is in whole or in part an automatic operation based on results of the measurement of the one or more laser range finders.

It will be appreciated that while the exemplary embodiments of the guide dresser as shown in the figures herein have the rail or slide system in a horizontal orientation generally parallel to the ground or floor, other configurations are contemplated, such as for example where the slide or rail system is tilted or in an up/down configuration. The rail or slide system also need not provide slidable movement in a linear direction but may also provide a curved path of movement or any other configuration.

Reference will now be made in detail to exemplary embodiments of the disclosure, wherein numerals refer to like components, examples of which are illustrated in the accompanying drawings that further show exemplary embodiments, without limitation.

FIGS. 1A & 1B and FIGS. 2A & 2B illustrate side and top views, respectively, of an exemplary embodiment of a guide dresser 10 according to the present disclosure. The guide dresser 10 as shown in FIGS. 1A & 1B and 2A & 2B comprises a rail or slide system 12, a first cutter assembly 20 having a first rotatable cutter head 22 and a motor 24, a second cutter assembly 30 having a second rotatable cutter head 32 and a motor 34, and a guide mount 40. The guide mount 40 is capable of receiving a saw guide 50.

In the guide dressers of the present disclosure, the first cutter assembly 20 and the second cutter assembly 30 are slidably mounted on the rail or slide system 12. By "rail or slide system", it is meant to refer to any arrangement of components that allow for movement of the first and second cutter assemblies (20, 30). The rail or slide system 12 may, for example and without limitation, include wheels, tracks, trolleys, grooves, slides, bearings, or any combination thereof. In an embodiment, the rail or slide system 12 is a track-and-trolley system. In an embodiment, the rail or slide system 12 comprises a ball screw and linear bearings. By "slidably mounted", it is meant to refer to any type of movement whereby the cutter assembly (20, 30) is moved from one position to another while attached to the rail or slide system 12, or components thereof. The first cutter assembly 20 and the second cutter assembly 30 may be mounted on, or attached to, the rail or slide system 12 by any suitable means.

In some embodiments of the present disclosure, the rail or slide system 12 comprises a single continuous rail or slide component having both the first cutter assembly 20 and the second cutter assembly 30 slidably mounted thereon. For example, the rail or slide system 12 may extend a length that traverses past (e.g., in front of) the guide mount 40, with the first cutter assembly 20 mounted on the rail or slide system 12 on one side of the guide mount 40, and the second cutter assembly 30 mounted on the rail or slide system 12 on the other side of the guide mount 40.

In other embodiments, the rail or slide system 12 comprises a separate apparatus or structure for each of the first cutter assembly 20 and the second cutter assembly 30. For example, as shown in FIG. 1A, each of the first cutter assembly 20 and the second cutter assembly 30 may be mounted on its own rail or slide apparatus (14*a*, 14*b*).

The rail or slide system 12 may be configured for linear movement of each cutter assembly (20, 30), meaning that the cutter assemblies (20, 30) are moved along a straight path in the rail or slide system 12. Alternatively, the rail or slide system 12 may have a configuration that provides for non-linear movement of the cutter assemblies (20, 30). For example, the cutter assemblies (20, 30) may travel along a curved or arched path to approach the position of the guide mount 40.

Irrespective of the configuration of the rail or slide system 12, movement of the cutter assemblies (20, 30) may be manual, automated, or any combination thereof. In an embodiment, the position of each cutter assembly (20, 30) on the rail or slide system 12 is controlled with programmable controller, such as a programmable logic controller (PLC) and/or computer numerical control (CNC) programming. In an embodiment, the rail or slide system 12 comprises its own independent motor to drive movement of each cutter assembly (20, 30) on the rail or slide system 12. The motor may, for example, be a servo motor. In an embodiment, the rail or slide system 12 comprises servo motor-controlled ball screw and linear bearings for programmable and repeatable positioning of each cutter assembly (20, 30). The rpm and spherical alignment of the cutter heads (22, 32) may also be similarly control by manual processes, automated processes, or a combination thereof.

Referring again to FIGS. 1A & 1B and 2A & 2B, the first cutter assembly 20 and the second cutter assembly 30 each have respective rotatable cutter heads (22, 32). As used herein, the term "rotatable cutter head" is intended to refer to the cutting apparatus for engaging and milling a saw guide 50. The rotatable cutter head is, for example, mounted on a spindle to which rotational movement is applied. The rotational movement may be from any suitable source. In an embodiment, each cutter assembly (20, 30) has a motor (24, 34) to drive the rotational movement. The motor (24, 34) may, for example, be a belt drive motor which supplies rotational movement to a belt that is connected to both the motor and a spindle connect to the cutter heads (22, 32). In some embodiments, each cutter assembly (20, 30) has its own motor (24, 34) and drive system for providing rotational movement to the cutter heads (22, 32). In other embodiments, a single motor may be used to provide rotational movement to the cutter heads (22, 32) on both cutter assemblies (20, 30). Other arrangement and configurations to provide rotational movement to the cutter heads (22, 32) will be well-appreciated by the skilled person.

In operation, the guide dressers of the present disclosure maintain a saw guide 50 in a stationary position. In this regard, the guide dressers comprise a guide mount 40 for receiving and maintaining a saw guide 50 in this stationary position. By "stationary position", it is meant that the saw guide 50 is held in a fixed or substantially fixed position while one or both of the cutter assemblies (20, 30) are moved along the rail or slide system 12 to engage the saw guide 50. The guide mount 40 is configured for removable attachment of the saw guide 50 and is of sufficient strength to withstand the forces imparted by the cutter heads (22, 32) and keep the saw guide 50 stationary during milling operations.

The guide mount 40 is in a suitable position on the guide dresser 10 to place the saw guide 50 between the first rotatable cutter head 22 and the second rotatable cutter head 32. By this, it is meant that when the first cutter assembly 20 and second cutter assembly 30 travel to an end of, or position on, the rail or slide system 12 that is proximal to the guide mount 40, the cutter heads (22, 32) are positioned so as to be capable of engaging the saw guide 50 for milling and machining operations. In some embodiments, the guide mount 40 is positioned between the first cutter assembly 20 and second cutter assembly 30, but slightly askew so that the guide mount 40 does not interfere with the ability of the cutter heads (22, 32) to contact the saw guide 50. In some embodiments, the guide mount 40 is positioned to one side of the guide dresser 10 and the guide mount 40 has an extension component that places the saw guide 50 in the stationary position between the first rotatable cutter head 20 and the second rotatable cutter head 30.

In operation, the rail or slide system 12 permits movement or travel of the first rotatable cutter head 20 and the second rotatable cutter head 30 towards and away from the guide mount 40 to alternate between an "open position" and a "closed position". Thus, the guide dresser 10 of the present disclosure is capable of being adjusted between an open position and a closed position.

As used herein, the expression "open position" is intended to refer to a configuration of the guide dresser 10 whereby both the first cutter assembly 20 and second cutter assembly 30 are positioned away from the guide mount 40 on the rail or slide system 12. By "positioned away", it is meant that the cutter assembly (20, 30) is in a position on the rail or slide system 12 that the cutter head (22, 32) would not be capable of engaging or contacting the saw guide 50 when the saw guide 50 is received by the guide mount 40. In an embodiment, in the open position both the first cutter assembly 20 and second cutter assembly 30 are positioned as far away from the guide mount 40 as is permitted by the rail or slide system 12. In other embodiments, the first cutter assembly 20 and second cutter assembly 30 may independently be at any distance away from the guide mount 40 along the rail or slide system 12, and each may be at the same or a different distance away from the guide mount 40.

As used herein, the expression "closed position" is intended to refer to a configuration of the guide dresser 10 whereby both the first cutter assembly 20 and second cutter assembly 30 are positioned such that both the first cutter head 22 and second cutter head 32 are capable of contacting the saw guide 50 when it is received within the guide mount 40. In the closed position, the guide dresser 10 can operate to mill both sides of the saw guide 50.

In addition to the open position and closed position, it should be understood that the guide dresser 10 disclosed herein is capable of being operated in such a manner that only one of the cutter assemblies (20, 30) is positioned to allow the cutter head (22, 32) to engage or contact the saw guide 50, and thereby mill a single side of the saw guide 50.

In an embodiment, the guide dresser 10 of the present disclosure is fully enclosed within an encasement having a door. In an embodiment, the door is located to provide access to the guide mount 40. For milling a saw guide 50, a user or automated controller need only open the door and install a saw guide 50 on the guide mount 40. Installation of the saw guide 50 on the guide mount 40 is an easy process and is accurately repeatable to provide for reliability in accuracy of milling. In an embodiment, the guide dresser 10 can only be operated when a magnetic door lock is engaged.

Referring now to FIGS. 3A to 3E, each cutter assembly (20, 30) of the present disclosure includes a cutter head (22, 32). An embodiment of a cutter head (22, 32) of the present disclosure is shown in FIGS. 3A to 3E. In this embodiment, the cutter head (22, 32) comprises a circular disc 60 and one or more removable knife retention apparatuses 70, each of the one or more removable knife retention apparatuses for receiving a knife 80. The circular disc 60 is shaped like a wheel, having a front surface, a back surface and an outer perimeter surface. The circular disc 60 may have apertures traversing from its front surface to back surface. By "front surface" it is meant the side that performs the milling of the saw guide 50, and the back surface is the opposite side. Each of the knife retention apparatuses 70 can be permanently or removably mounted on the front surface of the circular disc 60.

Figure 3A:
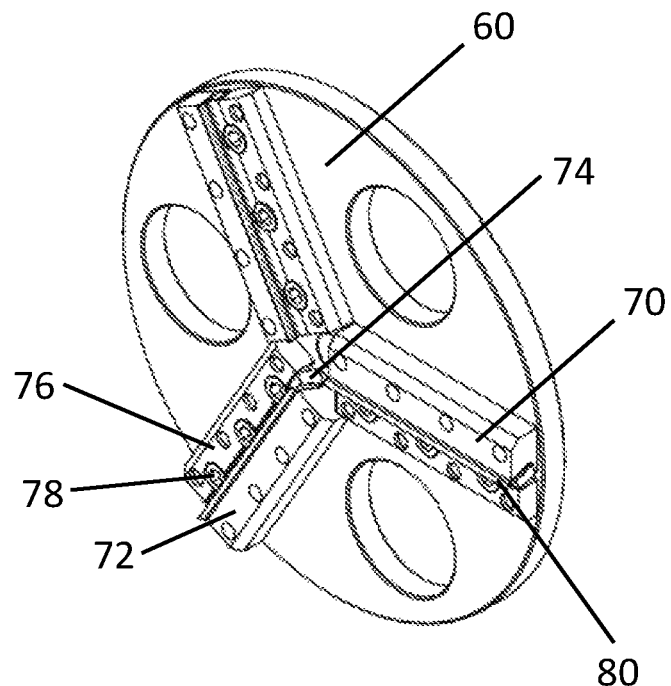
FIG. 3A is a perspective view of a front side of an exemplary cutter head of the present disclosure shaped as a circular disc and having knives contained within knife retention apparatuses.
Figure 3B:
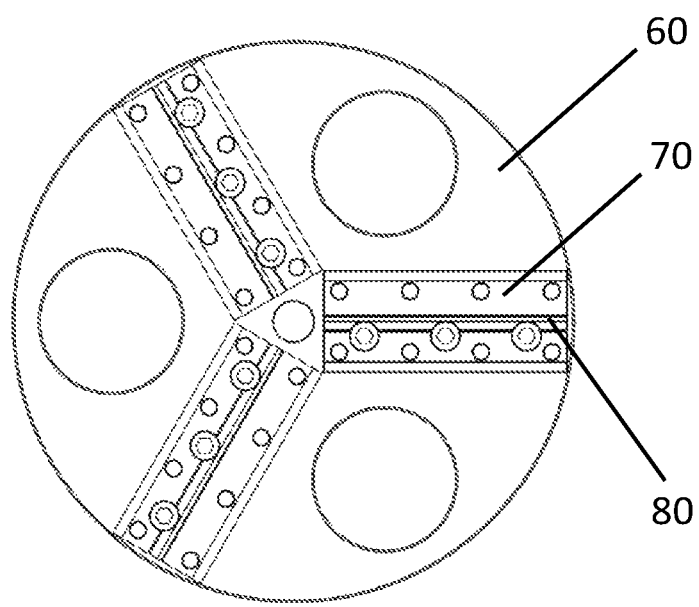
FIG. 3B is a top view of the front side of the cutter head of FIG. 3A.
Figure 3C:
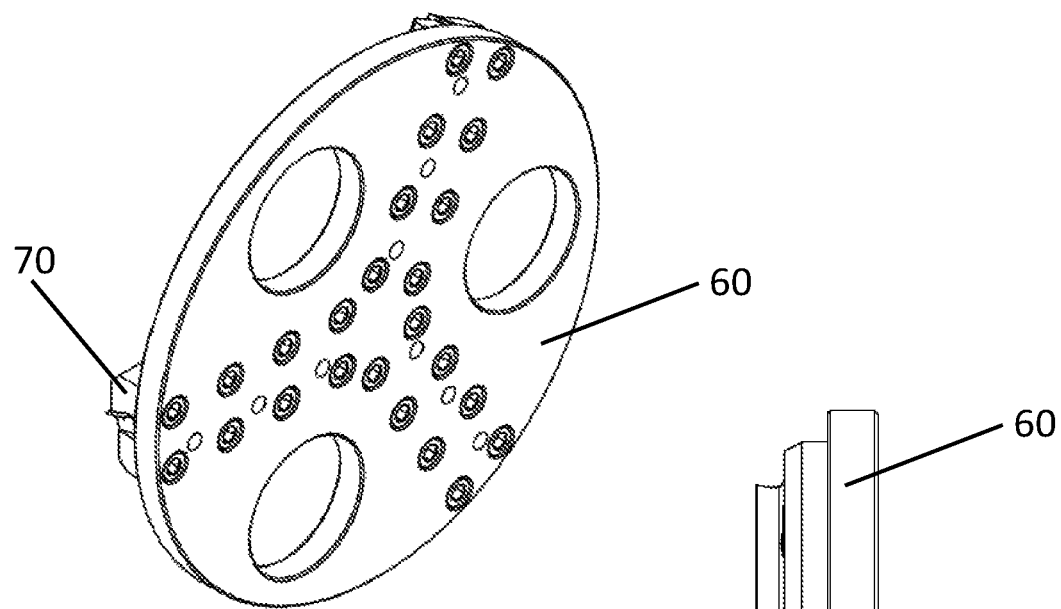
FIG. 3C is a perspective view of a back side of the cutter head of FIG. 3A.
Figure 3D:
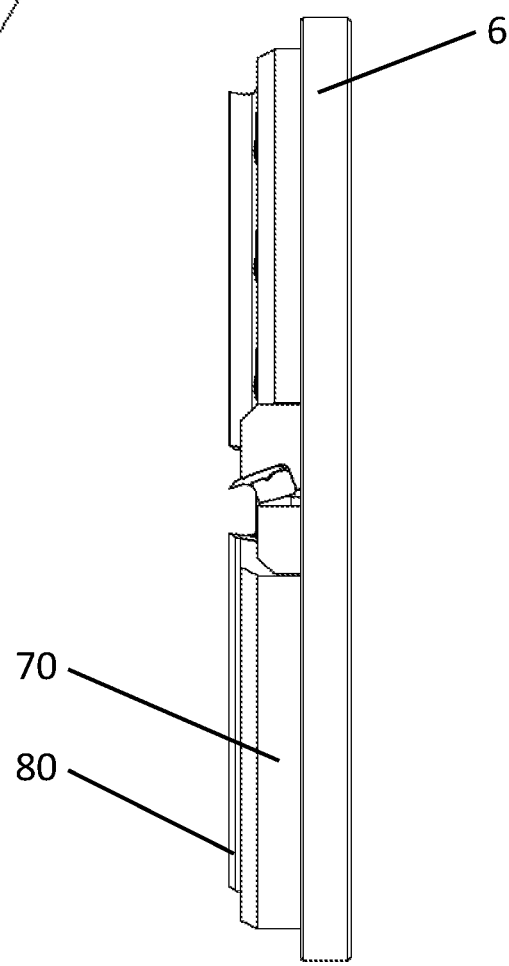
FIG. 3D is a side view of the cutter head of FIG. 3A.
Figure 3E:
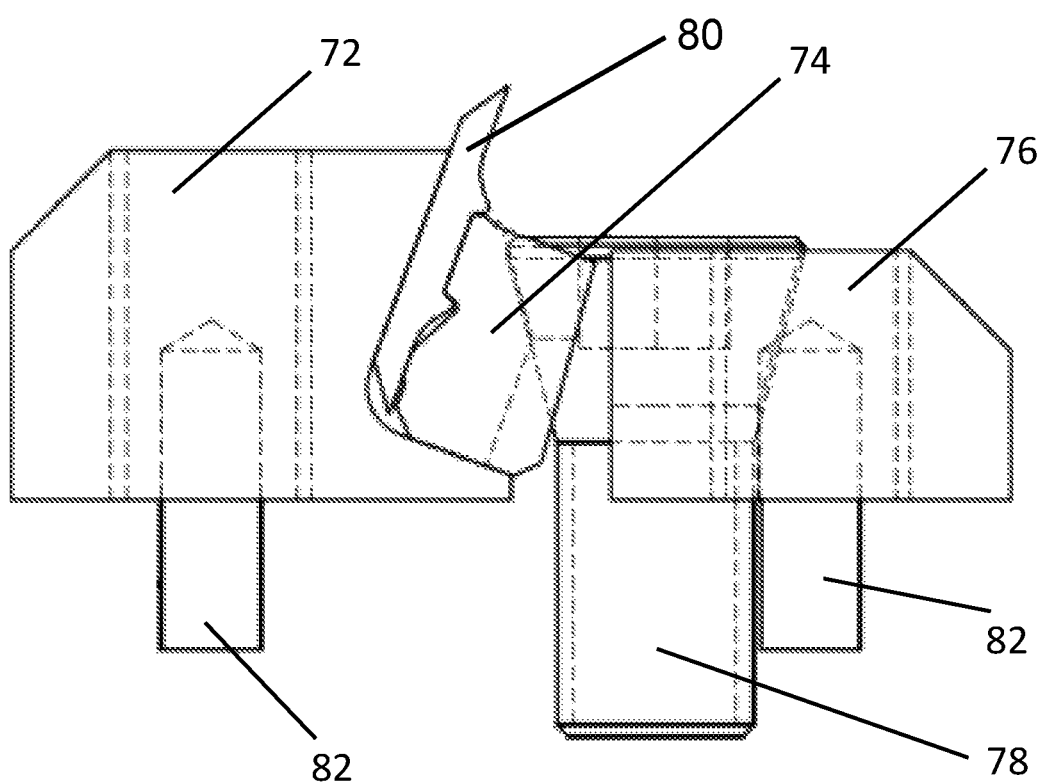
FIG. 3E is an extracted view of the knife retention apparatus shown as a component of the cutter head of FIG. 3A.

In an embodiment, the knife retention apparatus 70 is a configuration that can be removably mounted to the circular disc 60. An exemplary embodiment is shown in FIG. 3E where the knife retention apparatus 70 comprises a knife holder 72, a knife gib 74, a knife clamp 76, and one or more knife gib screws 78. In this configuration, the knife 80 is positioned between the knife holder 72 and the knife gib 74, with the knife jib 74 pressing against the knife 80 by way a force applied from the one of more knife screws 78. The knife clamp 76 is on the opposite side of the knife screws 78 from the knife gib 74 to act as a counterbalance to the force of the knife screws 78, for example by way of opposing notches in the knife gib 74 and knife clamp 76 into which at least a portion of the knife screw 78 is received. In some embodiments, the knife holder 72 and the knife clamp 76 include one or more mounting apertures for receiving a pin 82 protruding from the circular disc 60. In an embodiment, the pins 82 are dowel pins. The mounting apertures and pins 82 provide accuracy and rigidity the positioning of the knife retention apparatus 70, and therefore the position of the knife 80.

Many adjustments to the configuration of the knife retention apparatus 70 can be made. For example, the knife holder 72 can be manufactured to allow any desired knife angle by adjusting the angle of the wall of the knife holder 72 against which the knife 80 is held. In an embodiment, the angle can be any angle between about 15.0° and about 80.0° relative to the front surface of the circular disc 60. In an embodiment, the angle is between about 45.0° and about 75.0° relative to the front surface of the circular disc 60. As shown in FIG. 3A, the knife holder 72, knife gib 74, and knife clamp 76 may be of an elongate shape configured to substantially span a radius of the circular disc 60 when mounted on the circular disc 60. By "elongate shape", it is meant a structure that is longer in one direction (e.g., length) than in other directions (e.g., width, height). For example, and without limitation, an elongate shape may be similar to a rectangle in shape. By "substantially span a radius of the circular disc", it is meant to extend from near the center of the circular disc 60 to near the outer edge of the circular disc 60. This shape and configuration may be preferred for rigidity and accuracy, but other configurations can also be used.

In an embodiment, each knife retention apparatus 70 includes two or more knife screws 78. In an embodiment, each knife retention apparatus 70 includes 2, 3, 4, 5 or more knife screws 78. In an embodiment, each knife retention apparatus 70 includes three knife screws 78.

The cutter head (22, 32) may include any number of the knife retention apparatuses 70 on the circular disc 60. In an embodiment, cutter head (22, 32) includes 2, 3, 4, 5, 6, 7, 8, 9, 10 or more knife retention apparatuses 70 on the circular disc 60. In a particular embodiment, cutter head (22, 32) includes 3, 4 or 5 knife retention apparatuses 70 on the circular disc 60. The components of the knife retention apparatuses 70 may mounted on the circular disc 60 by any suitable means. In an embodiment, the knife retention apparatus 70 is mounted to the circular disc 60 by screws, bolts or other types of fasteners. In operation, each knife retention apparatus 70 would have a knife 80 received therein, with the blade protruding outwards.

Figure 4A:
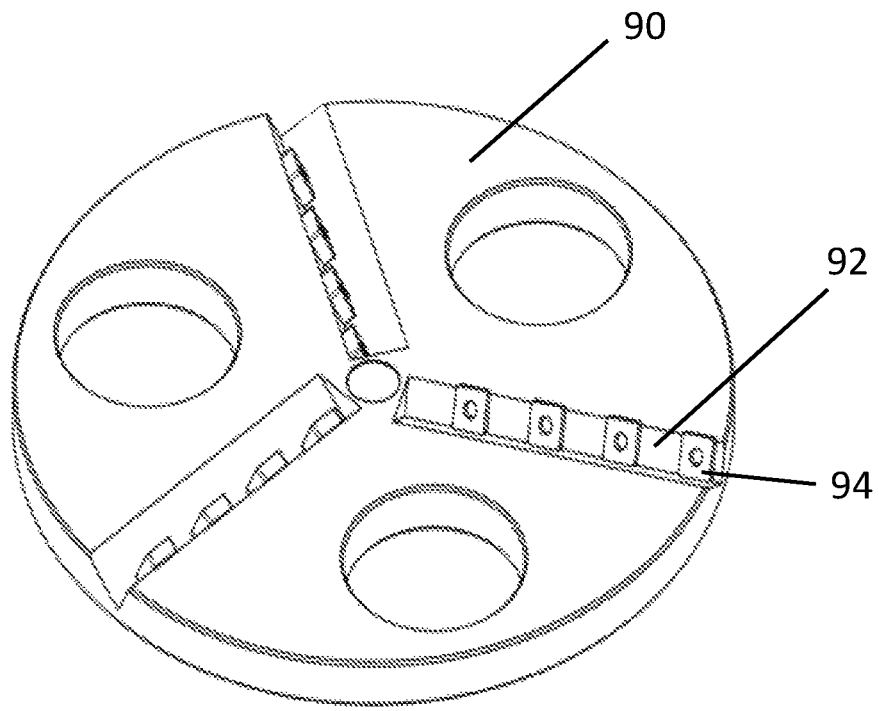
FIG. 4A is a perspective view of a front side of another exemplary cutter head of the present disclosure shaped as a circular disc and having carbide inserts as the milling implement.
Figure 4B:
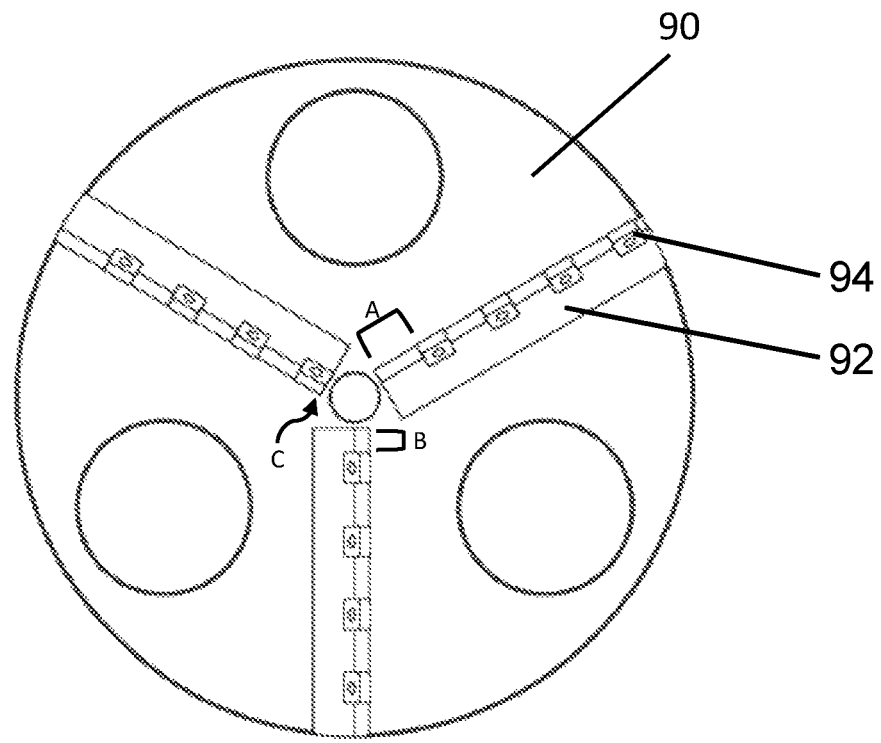
FIG. 4B is a top view of the front side of the cutter head of FIG. 4A.
Figure 4C:
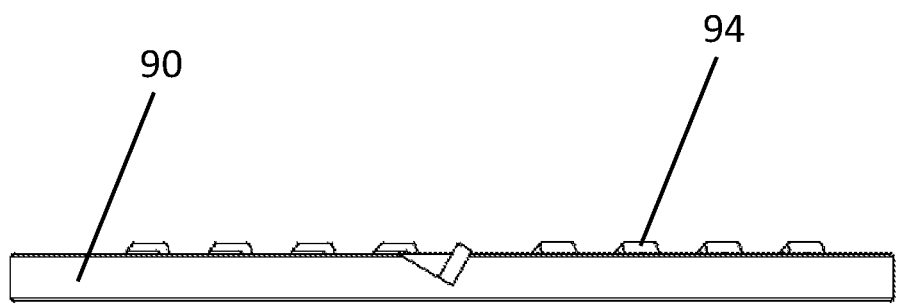
FIG. 4C is a side view of the cutter head of FIG. 4A.

Another exemplary embodiment of a cutter head (22, 32) of the present disclosure is shown in FIGS. 4A to 4C. In this embodiment, the cutter head (22, 32) comprises a circular disc 90 having grooves 92 on a front face thereof. By "front surface" it is again meant the side that performs the milling of the saw guide 50. Similar to circular disc 60, circular disc 90 having grooves 92 may have apertures traversing from its front surface to back surface. By "grooves", it is meant an indent or depression in the surface.

The grooves 92 may be of any suitable shape to receive two or more cutting implements 94. In an embodiment, each groove 92 is an elongate shape configured to substantially span a radius of the circular disc. By "elongate shape", it is meant an indent or depression that is longer in one direction (e.g., length) than in other directions (e.g., width, height). For example, and without limitation, an elongate shape of groove 92 may be a channel, in particular a linear channel. By "substantially span a radius of the circular disc", it is meant to extend from near the center of the circular disc 60 to near or at the outer edge of the circular disc 60. As shown in FIG. 4A, in an embodiment groove 92 extends from near the center of the circular disc 60 to the outer perimeter, with a portion of the outer perimeter surface also removed to form the groove 92. In other embodiments, the groove 92 may not extend into the outer perimeter surface, but rather may end just before the outer edge of the circular disc 92.

The cutter head (22, 32) may include any number of grooves. In an embodiment, the cutter head (22, 32) has at least two grooves 92. In an embodiment, the cutter head (22, 32) has 2, 3, 4, 5, 6, 7, 8, 9, 10, or more grooves 92. In an embodiment, the cutter head (22, 32) has 3, 4 or 5 grooves 92. In an embodiment, the cutter head (22, 32) has 3, 4 or 5 grooves 92 and each of the grooves 92 is an elongate shape configured to substantially span a radius of the circular disc. In an embodiment, the cutter head (22, 32) has three grooves 92 and each of the grooves 92 is an elongate shape configured to substantially span a radius of the circular disc.

The cutting implements 94 may be positioned at any suitable position within the groove 92 to expose a cutting surface for milling a saw guide 50, and there may be any suitable number of cutting implements 94 within each groove 92. In an embodiment, each groove 92 has at least two cutting implements 94 that are separate from each other. In an embodiment, each groove 92 independently has 2, 3, 4, 5, 6, 7, 8, 9, 10, or more cutting implements 94 that are separate from each other. In an embodiment, each groove 92 independently has 3, 4 or 5 cutting implements 94 that are separate from each other. Each groove 92 may have the same or a different number of cutting implements 94. In an embodiment, each groove 92 has four cutting implements 94 that are separate from each other.

In an embodiment, when two or more of the cutting implements 94 are positioned within a respective groove 92, the two or more cutting implements 94 are substantially equally spaced from each other along a radially extending wall within each groove 92. By "substantially equally spaced apart" it is meant that the distance or spacing between each of the cutting implements 94 along a length of the groove 92 is about the same. An example of this is shown in FIG. 4A where cutting implements 94 that are of a square shape are each spaced about the same distance from each other within groove 92. In other embodiments, the cutting implements 94 may not be equally spaced apart within the groove 94.

In an embodiment, when there are two or more grooves 92, the cutting implements 94 in each groove 92 may be radially offset from the cutting implements in another groove 92. For example, the cutting implements 94 in each groove 92 may be offset from the center of the circular disc 90 by a different distance. An example of this is shown in FIG. 4B where the cutting implement 94 closest to the center of the disc in each groove is positioned a different distance away from the center (as shown by A, B and C). By spacing identical cutting implements 94 at different distances from the center of the circular disc 90, and then having the cutting implements 94 equally spaced apart within the groove 92, this causes each cutting implement 94 to follow a different circular path upon rotation of the cutter head (22, 32). Thus, upon circular rotation, the two or more cutting implements 94 in each groove cuts a different circular area than the two or more cutting implements 94 in the other grooves. By "circular area" it is meant to refer to the area in the circular path of all of the cutting implements 94 within a respective groove. Since the cutting implements 94 are spaced apart, there would be alternating 'cut' and 'cut' paths for each groove 92. In an embodiment, the cutting implements 94 in each groove can be arranged such the different circular area cut by the cutting implements 94 in each groove overlaps with a portion of the different circular area cut by the cutting implements 94 in at least one of the other grooves. This can be configured for any number of grooves 92 and any number of cutting implements 94 within each groove 92.

The cutting implements 94 may be any suitable cutting device for milling a saw guide 50. In an embodiment, the cutting implement 94 is a knife. In an embodiment, the cutting implements 94 are comprised of carbide. In an embodiment, the cutting implements 94 are approximately square or rectangle pieces of carbide. The cutting implements 94 may be secured to the circular disc 90 in any suitable manner. In an embodiment, the cutting implements 94 are secured to the circular disc 90 a screw or a clamp. In operation, each cutting implement 94 protrudes outwards from the grooves 92 by a sufficient amount to provide for milling of a saw guide 50 (see exemplary in FIG. 4C). The angle of the wall of the groove may be adjusted to change the angle by which the cutting implement 94 contacts the saw guide 50.

In an embodiment, the guide dresser 10 as disclosed herein comprises the cutter heads (22, 32) as disclosed herein. Combined usage of the guide dresser 10 and cutter heads (22, 32) of the present disclosure is advantageous in providing more accurate and reliable milling of saw guides 50.

Figure 5A:
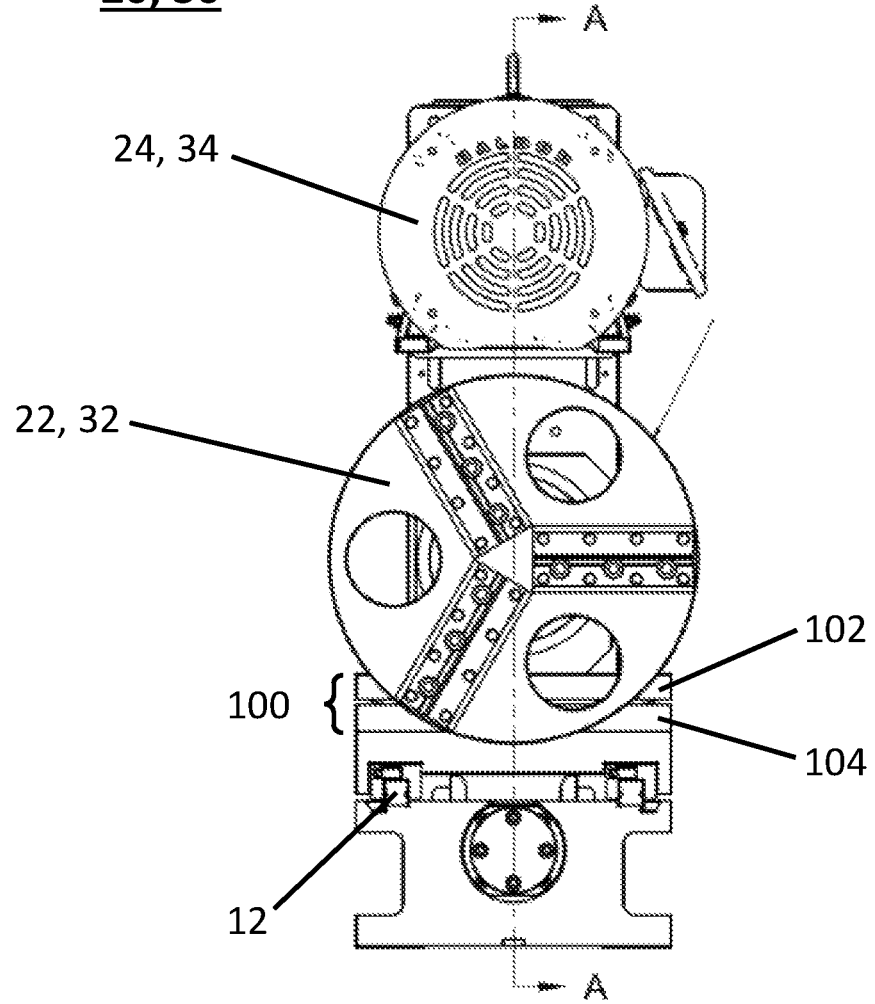
FIG. 5A is a front view of a cutter assembly according to some embodiments of the present disclosure.
Figure 5B:
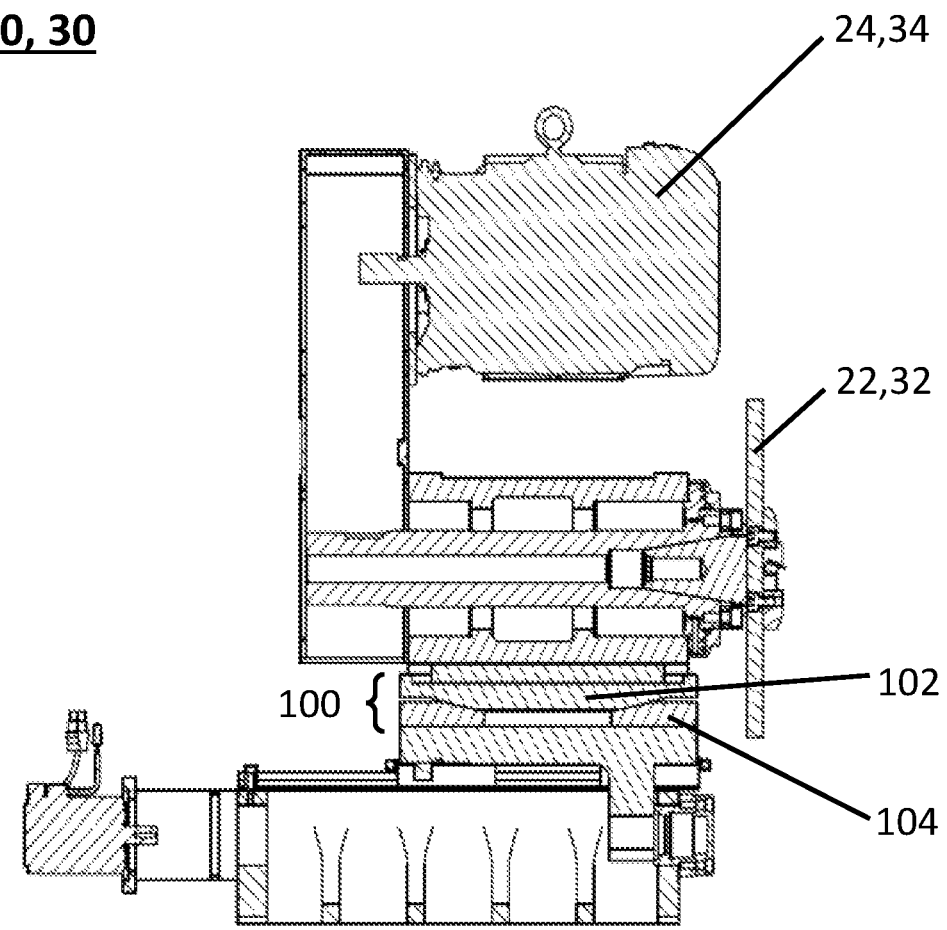
FIG. 5B is a cross-sectional view along the A-A line shown in FIG. 5A

Referring now to FIGS. 5A and 5B, in some embodiments one or both of the first cutter assembly 20 and the second head cutter assembly 30 may include a pivot component 100 for adjusting alignment of the respective cutter head (22, 32) in relation to a saw guide 50 to be milled. The pivot component 100 may be located on the underside of the cutter assembly (20, 30) and may be integral thereto or a separate component attached in some manner to the cutter assembly (20, 30). When equipped, the pivot component 100 is capable of allowing each cutter assembly to tilt independently in any direction to thereby adjust the alignment of the cutter heads (22, 32) in relation to a saw guide. Titling of the cutter heads (22, 32) can provide for more accurate and precise milling and machining of the saw guide. Since the cutter heads (22, 32) can tilt in any direction by way of the pivot component 100, the pivot component 100 provides a means of spherical adjustment.

In an embodiment, the pivot component 100 of the cutter assembly (20, 30) allows for adjusting vertical alignment of the respective cutter head (22, 32). By "vertical alignment" it is meant to refer to the vertical plane of the cutter head (22, 32), which may be perfectly perpendicular to the plane of travel of the cutter assembly (20, 30) on the rail or slide system 12, or may be slightly offset. In an embodiment, the vertical alignment is perfectly perpendicular to the plane of travel of the cutter assembly (20, 30). In an embodiment, the vertical alignment a straight up-down orientation. In some embodiments, the vertical alignment is offset from perpendicular to the plane of travel by about 0.1°, about 0.2°, about 0.3°, about 0.4°, about 0.5°, about 0.6°, about 0.7°, about 0.8°, about 0.9°, about 1.0°, about 1.25°, about 1.5°, about 1.75°, about 2.0°, about 2.25°, about 2.5°, about 2.75°, about 3.0°, about 3.5°, about 4.0°, about 4.5°, or about 5.0°.

In an embodiment, both the first cutter assembly 20 and the second cutter assembly 30 comprise a pivot component 100 for independently adjusting alignment of the respective cutter heads (22, 32).

In an embodiment, the pivot component 100 includes an upper part 102 and a lower part 104. The upper part 102 and lower part 104 may be of any suitable configuration to allow pivotable movement therebetween. In an embodiment, the upper part 102 is shaped like a spherical plate having a curved bottom that rests within a cupped portion of the lower part 104 (e.g., a spherical plate atop a spherical cup).

Figure 6:
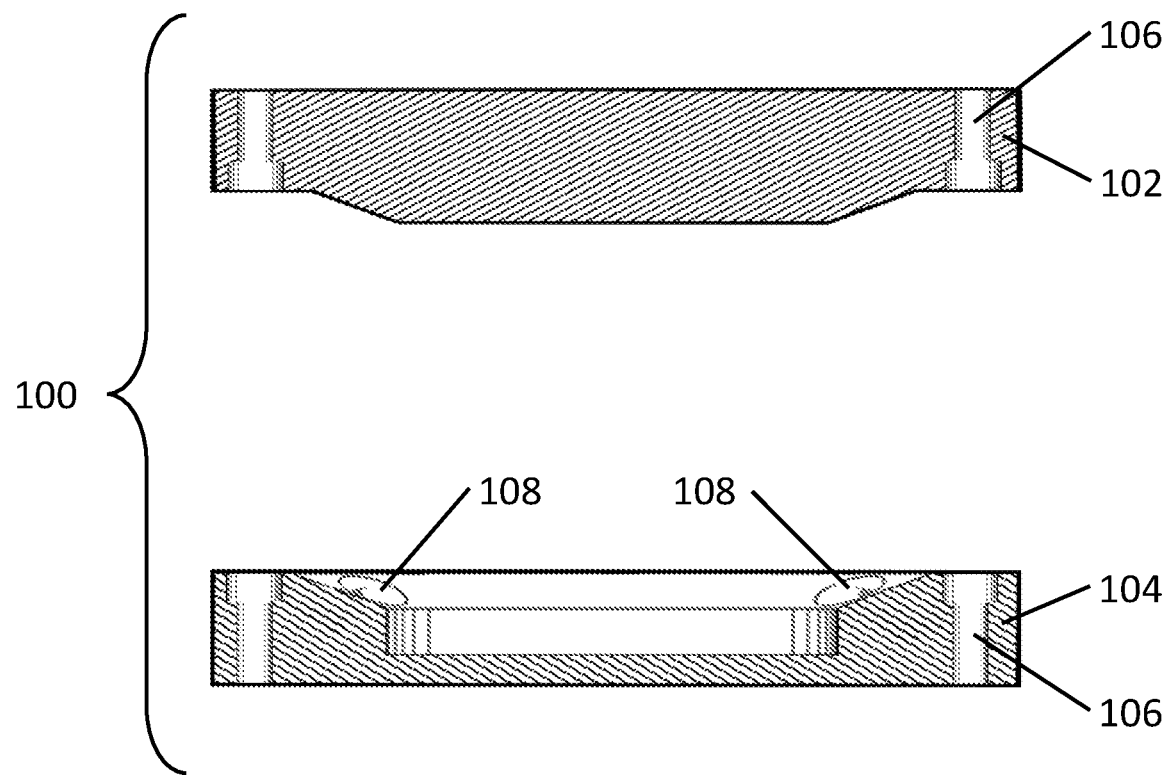
FIG. 6 is an exploded perspective view of an exemplary pivot component for use in association with embodiments of the cutter assembly of the present disclosure.

With reference to FIG. 6, a further embodiment of a pivot component 100 is shown in which the upper part 102 and a lower part 104 each comprise a threaded bore 106 for receiving a bolt (not shown) to affix the upper part 102 to the cutter assembly (20, 30) and the lower part 104 to the slide or rail system 12 or a base that is slidably mounted to the rail or slide system 12. Further, one or more convex caps 108 (e.g., protruding circular bumps) are provided on the shoulder of the cupped surface of the lower part 104 to facilitate the ease of pivotable adjustments.

Further suitable pivot components 100 for use in association with the guide dresser of the present disclosure may include a two-part pivotable block component, for example as disclosed in U.S. Pat. Nos. 9,199,320 and 10,267,450.

Figure 7:
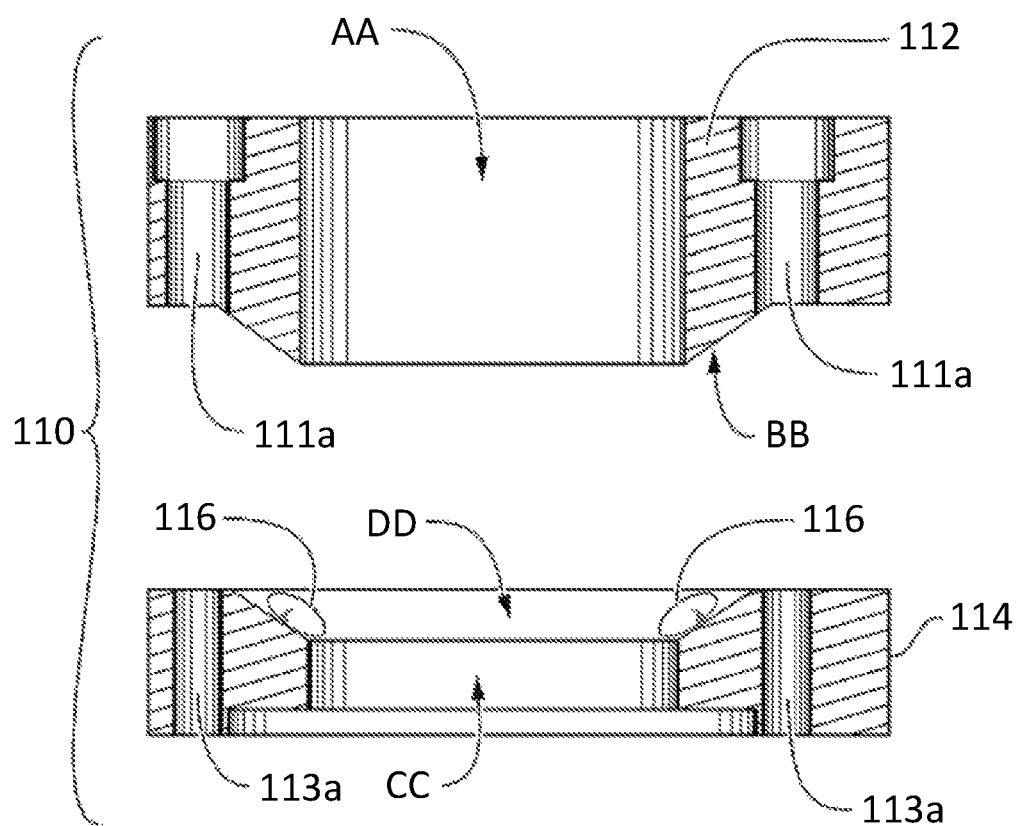
FIG. 7 is an exploded perspective view of a two-part pivotable block component for use in association with embodiments of the cutter assembly of the present disclosure.

An exemplary two-part pivotable block component 110 that may be used in association with the cutter assembly (20, 30) of the present disclosure is shown in FIG. 7. The two-part block component 110 comprises an upper block 112 and a lower block 114. The upper block 112 may be provided with threaded bores 111a aligned with bores 113a for receiving and engaging aligning bolts (not shown). Alternatively, the lower block may be provided with threaded bores for engaging aligning bolts inserted through bores provided therefore in the upper block.

The upper block 112 may be provided with a bore AA for receiving therethrough a post extending downward from the cutter assembly (20, 30). The upper block 112 has an outwardly inclined downward extending shoulder BB in the form of a frustoconical surface having a plane relative to a horizontal plane, selected from a range of between about 5° to about 75°, and more particularly between about 10° to about 45°. An exemplary suitable plane is about 10°, about 12.5°, about 15°, about 17.5°, about 20°, about 22.5°, about 25°, about 27.5°, about 30°, about 32.5°, about 35°, about 37.5°, about 40°, about 42.5°, about 45°, about 47.5°, or about 50°.

The lower block 114 may be provided with a bore CC that has a larger diameter than bore AA provided in upper block 112. It is preferable that the diameter of bore CC provides a gap between the lower block 114 and a post extending therethrough, for example a gap of about 2 mm, about 3 mm, about 4 mm, about 5 mm, about 6 mm, about 7 mm, about 8 mm, about 9 mm, about 10 mm, or anywhere therebetween. The lower block 114 has an inwardly receding inclined shoulder DD in the form of a frustoconical surface having a plane relative to the plane of the outwardly extending shoulder BB, that is offset to the plane of AA for example by about 0.25°, about 0.50°, about 0.75°, about 1.0°, about 1.25°, about 1.5°, about 1.75°, about 2.0°, about 2.25°, about 2.5°, about 2.75°, about 3.0°, about 3.5°, about 4.0°, about 4.5°, or about 5.0°. The offset in the planes between the outwardly inclined shoulder BB of upper block 112 and the inwardly receding inclined shoulder DD of lower block 114 enables precise pivotable adjustments of the cutter assembly (20, 30) in a three-dimensional space, and thereby alignment of the cutter head (22, 32). If so desired, one or more convex caps 116 may be provided on the upper shoulder BB or the lower shoulder DD (as shown in FIG. 7) to facilitate the ease of pivotable adjustments of the two-part block component 110. It is optional and within the scope of the present disclosure to provide the lower block 114 with an outwardly inclined upward extending shoulder, and to provide the upper block 112 with the inwardly receding inclined shoulder.

In other embodiments, the present disclosure relates to a method for milling a saw guide, the method comprising: moving a first cutter assembly 20 and a second cutter assembly 30 on a rail or slide system 12 to engage a first cutter head 22 of the first cutter assembly 20 and a second cutter head 32 of the second cutter assembly 30 against opposing sides of a stationary saw guide 50; and milling or machining the stationary saw guide 50.

In an embodiment of the methods herein, the position of each cutter assembly (20, 30) on the rail or slide system 12 is controlled with programmable controller, such as a programmable logic controller (PLC) and/or computer numerical control (CNC) programming. In an embodiment, the rail or slide system 12 comprises its own independent motor to drive movement of each cutter assembly (20, 30) on the rail or slide system 12. The motor may, for example, be a servo motor. In an embodiment, the rail or slide system 12 comprises servo motor-controlled ball screw and linear bearings for programmable and repeatable positioning of each cutter assembly (20, 30). The rpm and spherical alignment of the cutter heads (22, 32) may also be similarly control by automated processes.

In an embodiment of the methods disclosed herein, milling of a saw guide 50 using the movable cutter assemblies (20, 30) and the cutter heads (22, 32) of the present disclosure is capable of cutting to high tolerances (e.g., cut to within 0.0005").

Figure 8:
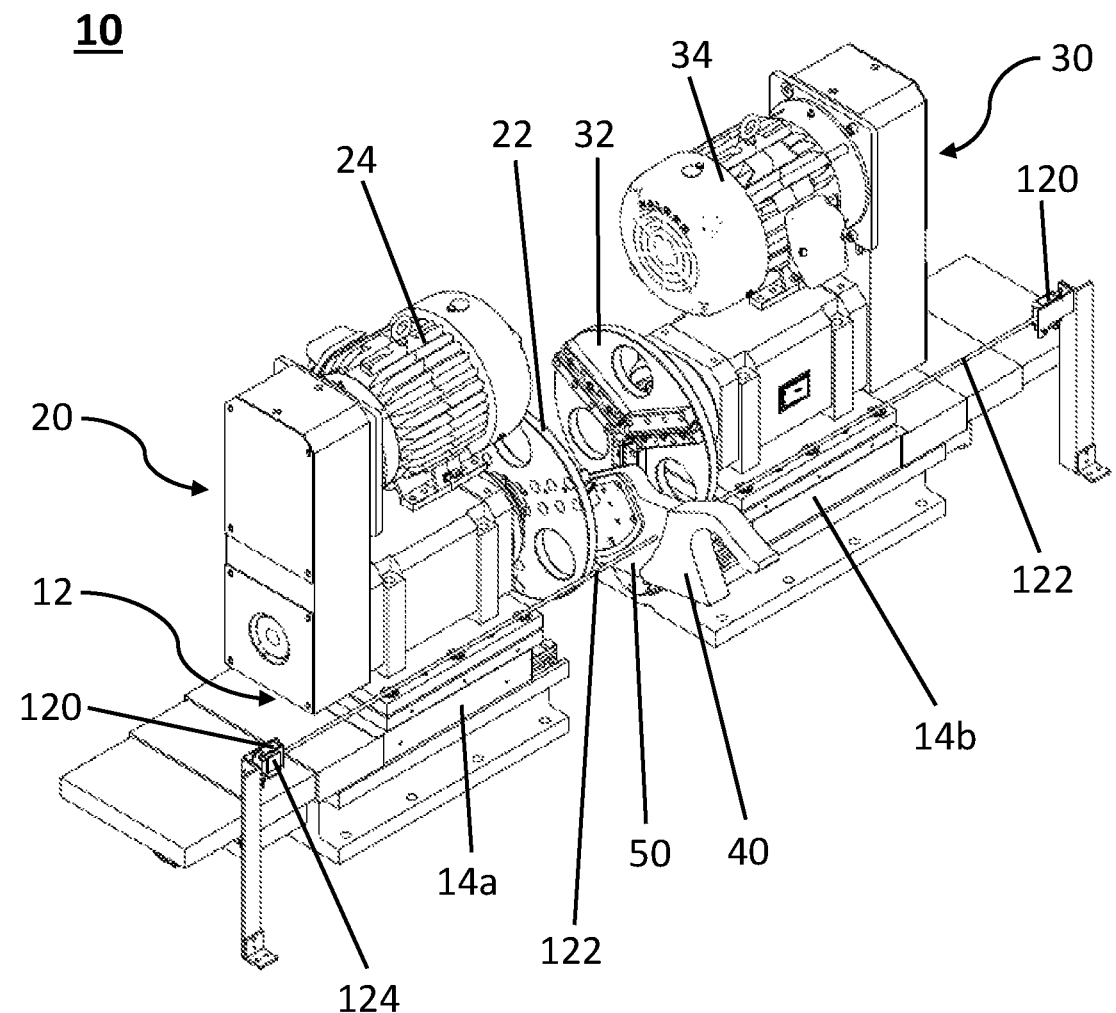
FIG. 8 is a perspective view of an automated guide dresser according to an embodiment of the present disclosure.

In some embodiments of the guide dressers herein, milling or machining of the saw guide is an automated operation. Referring to FIG. 8, the guide dresser of the present disclosure may comprise one or more laser range finders 120. The laser range finders 120 may be positioned and aligned in any suitable location on the guide dresser 10 to take a measurement of the saw guide 50 when it is positioned in the guide mount 40. As used herein, by "measurement" it is intended to mean a measure of distance, angle, or any combination thereof. The laser range finders 120 function to allow the guide dresser 10 to automatically identify which saw guide 50 (e.g., type, size, material, etc.) has been inserted into the guide dresser 10. In some embodiments, the laser range finder 120 may include additional analysis capabilities to obtain information regarding the saw guide 50. For example, the laser range finder 120 may include an optical scanner or imaging device that is capable of reading information displayed on the side of the saw guide 50, such as a bar code or QR code.

In the embodiment shown in FIG. 8, the guide dresser includes two of the laser range finders 120. A first laser range finder 120 is positioned on the same side of the guide dresser 10 as the first cutter assembly 20 and a second laser range finder 120 is positioned on the same side of the guide dresser 10 as the second cutter assembly 30. Each laser range finder 120 directs its beam 122 in the direction of the saw guide 50 to take a measurement. In the embodiment of FIG. 8, each of the laser range finders 120 is directed along the same horizontal plane as the other and positioned to take a measurement along the path of slidable movement of the respective cutter assembly (20, 30). As will be appreciated, this is an exemplary positioning of the laser range finders 120. In other embodiments, one or each of the laser range finders 120 may be at a different horizontal plane and/or aligned to measure the saw guide 50 from a different angle. See, for example, FIG. 10. In addition, there may be more than one laser range finder 120 directing its beam 122 to a particular side of the saw guide 50, such as one on a horizontal plane, one on an angle, one pointed at a different area or feature of the saw guide 50, or any combination thereof.

The guide dresser 10 is capable of interpreting the measurement from each laser range finder 120 to automatically control the movement of the cutter assemblies (20, 30) to enable the cutter heads (22, 32) to properly and accurately mill the saw guide 50, including by slidable movement along the rail or slide system 12 and/or pivotal movement about the pivotal component. In some embodiments, subsequent to obtaining measurements from the laser range finders 120 the entire milling or machining process is automated. In other embodiments, there may be steps that are not automated.

In an embodiment, during an initial setup phase each saw guide 50 may be mounted in the guide dresser 10 and a measurement from each side of the guide taken using the laser range finders 120. The measurement may be registered and stored in a database containing all other pertinent information about each saw guide (e.g., within PLC software), including for example laser range data, target size, number of Babbitt pads, and orientation of Babbitt pads (e.g., right or left). The initial setup phase may only be required once for each different type of saw guide 50 to create a stored database of saw guides 50, and afterwards whenever the guide dresser 10 identifies a saw guide 50 of that type using the laser range finders 120, automated operation can be performed without requiring further setup procedures.

For example, when in operation, a user may insert a saw guide 50 into the guide dresser 10 and select a protocol to identify the saw guide 50 (e.g., from a touchscreen). This command triggers the laser range finders 120 to take a measurement of the current saw guide 50 and compare the result (e.g., measurements) with the stored database of saw guides 50. Once the saw guide 50 is identified, its identity may be confirmed by the user, or this step of confirmation may not be required. The guide dresser 10 uses the identity of the saw guide 50 to move the cutter assemblies (one or both) from the open position to the closed position to cut the saw guide 50. This operation may be automatic, in whole or in part, based on results of the measurement of the laser range finders 120.

In some embodiments, an initial setup phase is not required and the automated operation of cutting the saw guides 50 can be performed without having stored information on the saw guide 50, based simply on the measurements taken by the laser range finders 120.

Automated operation of the cutter assemblies (20, 30) based on the measurements from the laser range finders 120 can involve one or more functionalities to ensure proper and accurate cutting of the saw guide 50. These functionalities may be achieved by controlling slidable movement along the rail or slide system 12 and/or pivotal movement about the pivotal component. These functionalities include, without limitation: ensuring the saw guide 50 is machined to the correct target size; identifying the number of Babbitt pads of the saw guide 50 and cutting appropriately, identifying which side of the saw guide 50 the Babbitt pads are on (if on only one side) and cutting appropriately, determining if the saw guide 50 is at an angle and making pivotal adjustments to the cutter heads (22, 32) for appropriate cutting, or any combination thereof.

In an embodiment, and as shown in FIG. 8, the guide dresser may include a data analyzer 124. The data analyzer 124 may be internal to or in a combined unit with one or more of the laser range finders 120 or may be an entirely separate unit on the guide dresser 10. In other embodiments, the data analyzer 124 may be located remotely from the guide dresser 10 and may communicate with the laser range finders 120 either by wired or wireless means. When equipped, the data analyzer 124 can provide various functions such as receiving the measurements from the laser range finders 120, identifying the type of saw guide 50 from the measurements, such as by comparing the measurements to the stored data, controlling the automated operation of the guide dresser 10, or any combination thereof. In order to identify the type of saw guide 50 from the measurements, the data analyzer may include or communicate with a database containing the stored information about one or more different types of the saw guide 50. This database may contain any number or quantity of stored pieces of information relating to saw guides 50, including without limitation laser range data, milling target size, number of Babbitt pads, orientation of the Babbitt pads, milling parameters, and milling thresholds. The data analyzer 124 may include a programmable logic controller (PLC).

Figure 9:
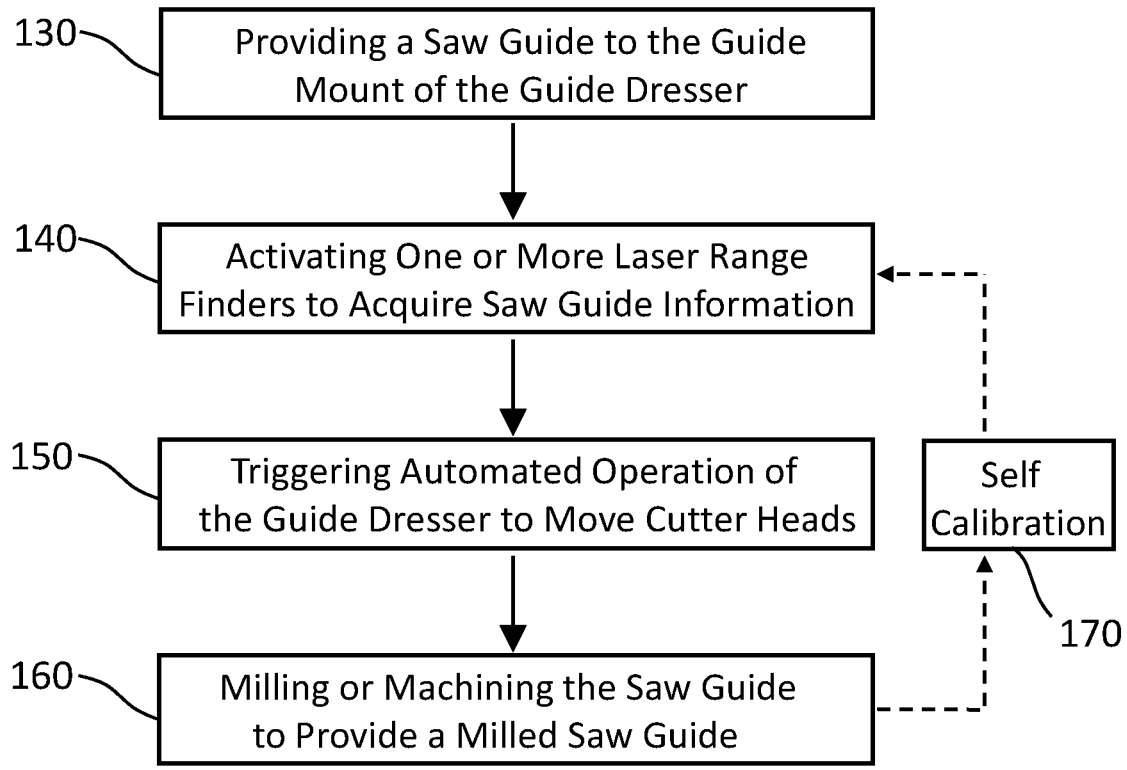
FIG. 9 is a flowchart showing the steps of a method for automated milling of a saw guide, according to one embodiment of the present disclosure.

In relation to embodiments in which the guide dresser 10 includes one or more laser range finders 120, as shown in FIG. 9 the present disclosure further provides a method for automated milling of a saw guide 50, the method comprising: providing a saw guide 50 to the guide mount 40 of the guide dresser 10 (130); activating the one or more laser range finders 120 to acquire measurements of the saw guide 50 (140); triggering automated operation of the guide dresser 10 to move the first cutter assembly 20 and the second cutter assembly 30 on the rail or slide system 12 to engage the first cutter head 22 of the first cutter assembly 20 and the second cutter head 32 of the second cutter assembly 30 against opposing sides of the saw guide 50 (150); and milling or machining the saw guide 50 to provide a milled saw guide 50 (160).

In an embodiment, the step of activating the one or more laser range finders 120 to acquire measurements of the saw guide 50 comprises two laser range finders 120 each acquiring the measurement from an opposite side of the saw guide 50. As discussed elsewhere herein, the laser range finders 120 may be positioned at any suitable position and at any trajectory to the saw guide 50. In an embodiment, the two laser range finders 120 are on the same horizontal plane and the beam 122 follows the path along the rail or slide system 12.

In an embodiment, the step of triggering automated operation of the guide dresser 10 comprises a step of comparing the measurements acquired by the one or more laser range finders 120 to stored information relating to laser range data, milling target size, number of Babbitt pads, orientation of the Babbitt pads, milling parameters, and milling thresholds for one or more different types of saw guides. As discussed elsewhere herein, the stored information may be based on an initial setup phase. Thus, in a further embodiment, the methods herein include a further step of performing an initial setup phase or initialization procedure to correspond measurements for particular saw guides 50 to information relating to that type of saw guide 50. The initialization procedure may include mounting different saw guides 50 to the guide mount 40, obtaining measurements from each side for each of the saw guides 50 to provide the laser range data for each saw guide 50; correlating the measurements to a set of parameters for each saw guide 50 to provide a correlated dataset, and storing the correlated dataset as the stored information.

In an embodiment, the step of triggering automated operation of the guide dresser 10 comprises a step of activating automated operation of the guide dresser 10 based on an identity of the saw guide 50 determined by the step of comparing the measurements acquired by the one or more laser range finders 120 to the stored information. In an embodiment, a programmable logic controller (PLC) uses the stored information to ensure a correct target size of the saw guide is milled.

In an embodiment, the methods herein may further include a self-calibration procedure (170) of measuring the milled saw guide 50; calculating the difference between a target size and a milled size; and adjusting milling parameters for subsequent operation. In an embodiment, the subsequent operation is repeating steps 150 and 160, after the measuring the milled saw guide 50 by repeating step 140.

In an embodiment of the methods herein, the entirety of the method, subsequent to providing the saw guide to the guide mount (130), is automated. In other embodiments, the method is partly automated. For example, in some embodiments, after step 160 when the milled saw guide 50 is provided, the user may be prompted to manually input the measurement of the milled saw guide 50 into the guide dresser 10 (e.g., into the PLC control). The guide dresser 10 can then use that input to calculate the difference between the target size and the actual measurement and adjust accordingly for the repeated milling step, which the user may manually initiate.

Advantageously, the guide dresser 10 and methods herein allow a user to put in at random any saw guide 50 that has been registered in the guide dresser 10 and repeat the milling process without needing to recalibrate the guide dresser 50 during saw guide 50 style changes.

In other embodiments, the present disclosure relates to a kit comprising one or more components of the cutter heads (22, 32) described herein. For example, in an embodiment, the present disclosure relates to a kit comprising a circular disc 60 for use as a cutter head (22, 32), and one or more removable knife retention apparatuses 70 as disclosed herein. The kit may further comprise one or more knives 80 for mounting in each of the removable knife retention apparatuses 70. In another embodiment, the kit may comprise a circular disc 90 having two or more grooves 92 on a face thereof for use as a cutter head, and two or more cutting implements 94.

EXEMPLARY EMBODIMENTS

In exemplary and non-limiting embodiments, the present disclosure relates to the following:

(1) A guide dresser for milling a saw guide, the guide dresser comprising: a rail or slide system; a first cutter assembly slidably mounted on the rail or slide system, the first cutter assembly having a first rotatable cutter head; a second cutter assembly slidably mounted on the rail or slide system, the second cutter assembly having a second rotatable cutter head; and a guide mount for receiving and maintaining in a stationary position a saw guide, the stationary position being between the first rotatable cutter head and the second rotatable cutter head and the rail or slide system aligned for moving each of the first cutter assembly and second cutter assembly towards or away from the guide mount, the guide dresser being adjustable between an open position and a closed position by slidable movement of the first cutter assembly, the second cutter assembly, or both, wherein: when in the open position, both the first cutter assembly and the second cutter assembly are positioned away from the guide mount on the rail system, and when in the closed position, both the first cutter assembly and the second cutter assembly are positioned proximal to the guide mount on the rail system, such that both the first cutter head and second cutter head are capable of contacting the saw guide when it is received within the guide mount.

(2) The guide dresser of (1), wherein each of the first cutter assembly and the second cutter assembly comprise a motor to impart rotational movement to the first and second rotatable cutter head.

(3) The guide dresser of (1) or (2), wherein the first cutter assembly comprises a pivot component for adjusting alignment of the first cutter head.

(4) The guide dresser of (1) or (2), wherein each of the first cutter assembly and the second cutter assembly comprise a pivot component for independently adjusting alignment of the first cutter head and the second cutter head.

(5) The guide dresser of (3) or (4), wherein the pivot component is a two-part pivotable block component.

(6) The guide dresser of (5), wherein the two-part pivotable block component comprises an upper spherical plate and a lower spherical cup, the upper spherical plate pivotably and slidably engaged with the lower spherical cup.

(7) The guide dresser of (5), wherein the two-part pivotable block component comprises: an upper block that is engaged with the first cutter assembly or the second cutter assembly; and a lower block that is slidably mounted to the rail or slide system or, alternatively, is engaged with a base that is slidably mounted to the rail or slide system, wherein the upper block has a first inclined surface in a first plane for pivotably and slidably engaging a second inclined surface in a second plane provided on the lower block, and wherein: the first inclined surface in the first plane is at an angle defined by a first angle from a horizontal plant; the second inclined surface in the second plane is at an angle defined by a second angle from the horizontal plane; and the first angle and the second angle are different angles.

(8) The guide dresser of (7), wherein the first inclined surface of the upper block is outwardly extending, and the second inclined surface of the lower block is inwardly receding.

(9) The guide dresser of (7), wherein the first inclined surface of the upper block is inwardly receding, and the second inclined surface of the lower block is outwardly extending.

(10) The guide dresser of any one of (7) to (9), wherein one or both of the first inclined surface and the second inclined surface is provided with at least one convex cap extending outward therefrom.

(11) The guide dresser of any one of (7) to (10), wherein the second inclined surface is offset from the first inclined surface by about 0.25° to about 5.0°.

(12) The guide dresser of (5), wherein the two-part pivotable block component comprises: an upper block that is engaged with the first cutter assembly or the second cutter assembly; and a lower block that is slidably mounted to the rail or slide system or is engaged with a base that is slidably mounted to the rail or slide system wherein the upper block has a first frustoconical surface for pivotably engaging a second frustoconical surface provided therefor on the lower block, and wherein one or both of the first frustoconical surface and the second frustoconical surface has at least one convex cap extending outwardly therefrom for facilitating pivotable adjustment of the two-part block component.

(13) The guide dresser of (12), wherein the first frustoconical surface of the upper block is outwardly extending and the second frustoconical surface of the lower block is inwardly receding.

(14) The guide dresser of (12), wherein the first frustoconical surface of the upper block is inwardly receding and the second frustoconical surface of the lower block is outwardly extending.

(15) The guide dresser of any one of (3) to (14), wherein, when in operation and the vertical positioning of the saw guide is skewed from a vertical direction, the pivot component aligns the first and second rotatable cutter heads.

(16) The guide dresser of any one of (1) to (15), wherein the rail or slide system comprises a single continuous rail or slide component having both the first cutter assembly and the second cutter assembly slidably mounted thereon.

(17) The guide dresser of any one of (1) to (15), wherein the rail or slide system comprises: a first rail or slide apparatus having the first cutter assembly slidably mounted thereon; and a second rail or slide apparatus having the second cutter assembly slidably mounted thereon.

(18) The guide dresser of any one of (1) to (17), which comprises a servo motor-controlled ball screw for modulating slidable movement of the first cutter assembly and the second cutter assembly along the rail or slide system.

(19) The guide dresser of any one of (1) to (18), wherein in operation the saw guide remains in the stationary position and the first and second cutter heads are fed into the saw guide by slidable movement of the first cutter assembly and the second cutter assembly towards the guide mount using automated and/or programmable CNC controls.

(20) The guide dresser of any one of (1) to (19), wherein each of the first cutter head and the second cutter head is a circular disc comprising one or more knives projecting from a side of the circular disc.

(21) The guide dresser of (20), wherein the circular disc comprises a knife retention apparatus for holding each of the one or more knives in place.

(22) The guide dresser of (21), wherein the knife retention apparatus comprises a knife holder, a knife gib, a knife gib screw, and a knife clamp.

(23) The guide dresser of any one of (20) to (22), wherein the circular disc comprises three knives projecting from the side.

(24) The guide dresser of any one of (1) to (19), wherein each of the first cutter head and the second cutter head is a circular disc comprising two or more grooves on a side of the circular disc into which two or more cutting implements are mounted.

(25) The guide dresser of (24), wherein the two or more cutting implements are comprised of carbide.

(26) The guide dresser of (24) or (25), wherein the two or more cutting implements in each groove of the two or more grooves are offset from the center of the circular disc by a different distance along the radially extending wall as compared to the two or more cutting implements in the other grooves.

(27) The guide dresser of (26), wherein upon rotational movement of the circular disc, the two or more cutting implements in each groove of the two or more grooves cuts a different circular area than the two or more cutting implements in the other grooves.

(28) A method for milling a saw guide, the method comprising: moving a first cutter assembly and a second cutter assembly on a rail or slide system to engage a first cutter head of the first cutter assembly and a second cutter head of the second cutter assembly against opposing sides of a stationary saw guide; and milling or machining the stationary saw guide.

(29) The method of (28), wherein moving the first cutter assembly and the second cutter assembly is by an automated process.

(30) The method of (29), wherein the automated process comprises programmable CNC controls.

(31) The method of any of (28) to (30), wherein the first cutter assembly and the second cutter assembly are as defined in any one of (1) to (27).

(32) A cutter head, the cutter head comprising a circular disc and one or more removable knife retention apparatuses, each of the one or more removable knife retention apparatuses for receiving a knife.

(33) The cutter head of (32), wherein each of the one of more removable knife retention apparatuses comprises a knife holder, a knife gib, a knife clamp, and one or more knife gib screws.

(34) The cutter head of (33), wherein each of the knife holder and the knife clamp are an elongate shape configured to substantially span a radius of the circular disc when mounted on the circular disc.

(35) The cutter head of (34), wherein each of the knife holder and the knife clamp comprise one or more mounting apertures, each of the one or more mounting apertures for receiving a pin protruding from the circular disc.

(36) The cutter head of (34) or (35), wherein the knife gib is of the elongate shape configured to substantially span the radius of the circular disc when mounted on the circular disc, and the knife gib and the knife clamp have corresponding notches for receiving a portion of the knife gib screw.

(37) The cutter head of any one of (33) to (36), wherein, when the removable knife retention apparatus is assembled on the circular disc to receive the knife, the knife is positioned between the knife holder and the knife gib to project a blade of the knife outwardly therefrom, and the knife is held in position by a force applied to the knife by the knife gib, the force exerted and maintained by the knife screw.

(38) The cutter head of any one of (32) to (37), comprising at least three of the one or more removable knife retention apparatuses mounted on the circular disc, each of the one or more removable knife retention apparatuses having the knife received therein.

(39) A cutter head, the cutter head comprising a circular disc having two or more grooves on a face thereof, each groove of the two or more grooves for receiving two or more cutting implements.

(40) The cutter head of (39), wherein each groove of the two or more grooves is an elongate shape configured to substantially span a radius of the circular disc.

(41) The cutter head of (39) or (40), comprising at least three of the two or more grooves.

(42) The cutter head of any one of (39) to (41), wherein, when received in the two or more grooves, each of the two or more cutting implements are substantially equally spaced from each other along a radially extending wall within each groove of the two or more grooves.

(43) The cutter head of (42), wherein, when received in the two or more grooves, the two or more cutting implements in each groove of the two or more grooves are offset from the center of the circular disc by a different distance along the radially extending wall as compared to the two or more cutting implements in the other grooves.

(44) The cutter head of (43), wherein, when in operation in a circular rotation, the two or more cutting implements in each groove of the two or more grooves cuts a different circular area than the two or more cutting implements in the other grooves.

(45) The cutter head of (44), wherein, when in operation in the circular rotation, the different circular area cut by the two or more cutting implements in each groove overlaps with a portion of the different circular area cut by the two or more cutting implements in at least one of the other grooves.

(46) The cutter head of any one of (39) to (45), wherein the two or more cutting implements are comprised of carbide.

(47) The cutter head of any one of (39) to (46), wherein the two or more cutting implements are secured to the cutter head by a screw or a clamp.

(48) A guide dresser for milling a saw guide, the guide dresser comprising: a rail or slide system; a first cutter assembly slidably mounted on the rail or slide system, the first cutter assembly having a first rotatable cutter head; a second cutter assembly slidably mounted on the rail or slide system, the second cutter assembly having a second rotatable cutter head; a guide mount for receiving and maintaining in a stationary position a saw guide, the stationary position being between the first rotatable cutter head and the second rotatable cutter head and the rail or slide system aligned for moving each of the first cutter assembly and second cutter assembly towards or away from the guide mount, and one or more laser range finders positioned and aligned to take a measurement of the saw guide when the saw guide is positioned in the guide mount, the guide dresser being automatically adjustable between an open position and a closed position by slidable movement of the first cutter assembly, the second cutter assembly, or both, wherein: when in the open position, both the first cutter assembly and the second cutter assembly are positioned away from the guide mount on the rail system, and when in the closed position, both the first cutter assembly and the second cutter assembly are positioned proximal to the guide mount on the rail system, such that both the first cutter head and second cutter head are capable of contacting the saw guide when it is received within the guide mount, wherein the slidable movement between the open position and the closed position is in whole or in part an automatic operation based on results of the measurement of the one or more laser range finders.

(49) The guide dresser of (48), wherein the slidable movement between the open position and the closed position is in whole controlled by the automatic operation.

(50) The guide dresser of (48) or (49), wherein each of the one or more laser range finders is aligned to measure the saw guide from a different angle.

(51) The guide dresser of any one of (48) to (50), wherein the one or more laser range finders comprise: a first laser range finder positioned on the same side of the guide dresser as the first cutter assembly, and positioned and aligned to take the measurement along the path of slidable movement of the first cutter assembly; and a second laser range finder positioned on the same side of the guide dresser as the second cutter assembly, and positioned and aligned to take the measurement along the path of slidable movement of the second cutter assembly.

(52) The guide dresser of any one of (48) to (51), further comprising a data analyzer for receiving the measurement and controlling the automatic operation.

(53) The guide dresser of (52), wherein the data analyzer identifies the type of the saw guide from the measurement of the one or more laser range finders.

(54) The guide dresser of (52) or (53), wherein the data analyzer comprises or communicates with a database containing stored information about one or more different types of the saw guide.

(55) The guide dresser of (54), wherein the database comprises stored information relating to laser range data, milling target size, number of Babbitt pads, orientation of the Babbitt pads, milling parameters, and milling thresholds for each of the one or more different types of the saw guide.

(56) The guide dresser of any one of (48) to (55), which comprises a programmable logic controller (PLC).

(57) The guide dresser of any one of (48) to (56), wherein the automatic operation comprises one or both of (i) slidable movement of the first cutter assembly and the second cutter assembly on the rail or slide system and (ii) pivotal movement of the first cutter assembly and the second cutter assembly about a pivot component.

(58) The guide dresser of (57), wherein the pivotal component is a two-part pivotable block component comprising an upper spherical plate and a lower spherical cup, the upper spherical plate pivotably and slidably engaged with the lower spherical cup.

(59) The guide dresser of (57) or (58), wherein, when in operation and the vertical positioning of the saw guide is skewed from a vertical direction, the pivot component automatically aligns the first and second rotatable cutter heads based on the measurement from the one or more laser range finders.

(60) A method for automated milling of a saw guide, the method comprising: providing a saw guide to the guide mount of the guide dresser of any one of (48) to (59); activating the one or more laser range finders to acquire measurements of the saw guide; triggering automated operation of the guide dresser to move the first cutter assembly and the second cutter assembly on the rail or slide system to engage the first cutter head of the first cutter assembly and the second cutter head of the second cutter assembly against opposing sides of the saw guide; and milling or machining the saw guide to provide a milled saw guide.

(61) The method of (60), wherein the step of activating the one or more laser range finders to acquire measurements of the saw guide comprises two laser range finders each acquiring the measurement from an opposite side of the saw guide.

(62) The method of (60) or (61), wherein the step of triggering automated operation of the guide dresser comprises a step of comparing the measurements acquired by the one or more laser range finders to stored information relating to laser range data, milling target size, number of Babbitt pads, orientation of the Babbitt pads, milling parameters, and milling thresholds for one or more different types of saw guides.

(63) The method of (62), wherein the stored information was previously obtained and stored in a database during an initialization procedure, the initialization procedure comprising: mounting different saw guides to the guide mount, obtaining measurements from each side for each of the saw guides to provide the laser range data for each saw guide; correlating the measurements to a set of parameters for each saw guide to provide a correlated dataset, and storing the correlated dataset as the stored information.

(64) The method of (62) or (63), wherein the step of triggering automated operation of the guide dresser comprises a step of activating automated operation of the guide dresser based on an identity of the saw guide determined by the step of comparing the measurements acquired by the one or more laser range finders to the stored information.

(65) The method of any one of (62) to (64), wherein a programmable logic controller (PLC) uses the stored information to ensure a correct target size of the saw guide is milled.

(66) The method of any one of (60) to (65), further comprising a self-calibration procedure of measuring the milled saw guide; calculating the difference between a target size and a milled size; and adjusting milling parameters for subsequent operation.

(67) The method of any one of (60) to (66), wherein the entirety of the method, subsequent to providing the saw guide to the guide mount, is automated.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be referenced herein, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A guide dresser for milling a saw guide, the guide dresser comprising:
   a rail or slide system;
   a first cutter assembly slidably mounted on the rail or slide system, the first cutter assembly having a first rotatable cutter head;
   a second cutter assembly slidably mounted on the rail or slide system, the second cutter assembly having a second rotatable cutter head;
   a guide mount for receiving and maintaining in a stationary position the saw guide, the stationary position being between the first rotatable cutter head and the second rotatable cutter head, and the rail or slide system being aligned for moving each of the first cutter assembly and second cutter assembly towards and away from the guide mount; and
   one or more laser range finders each positioned and aligned to take a respective measurement of the saw guide when the saw guide is positioned in the guide mount,
   the guide dresser being automatically adjustable between an open position and a closed position by slidable movement of the first cutter assembly, the second cutter assembly, or both, wherein:
      when in the open position, both the first cutter assembly and the second cutter assembly are positioned away from the guide mount and on the rail or slide system, and
      when in the closed position, both the first cutter assembly and the second cutter assembly are positioned proximal to the guide mount and on the rail or slide system, such that both the first cutter head and second cutter head are capable of contacting the saw guide when the saw guide is received within the guide mount,
      wherein the slidable movement between the open position and the closed position is in whole or in part an automatic operation based on results of the measurement or measurements of the one or more laser range finders.

2. The guide dresser of claim 1, wherein the slidable movement between the open position and the closed position is in whole controlled by the automatic operation.

3. The guide dresser of claim 1, wherein the one or more laser range finders comprises a plurality of laser range finders that are each aligned to measure the saw guide from a different angle.

4. The guide dresser of claim 1, wherein the one or more laser range finders comprise:
   a first laser range finder positioned on a same side of the guide dresser as the first cutter assembly, and positioned and aligned to take the respective measurement along a path of slidable movement of the first cutter assembly; and
   a second laser range finder positioned on the same side of the guide dresser as the second cutter assembly and positioned and aligned to take the respective measurement along the path of slidable movement of the second cutter assembly.

5. The guide dresser of claim 1, further comprising a data analyzer for receiving the measurement or measurements and controlling the automatic operation.

6. The guide dresser of claim 5, wherein the data analyzer identifies a type of the saw guide from the measurement or measurements of the one or more laser range finders.

7. The guide dresser of claim 5, wherein the data analyzer comprises or communicates with a database containing stored information about one or more different types of the saw guide.

8. The guide dresser of claim 7, wherein the database comprises stored information relating to laser range data, milling target size, number of Babbitt pads, orientation of the Babbitt pads, milling parameters, and milling thresholds for each of the one or more different types of the saw guide.

9. The guide dresser of claim 1, which comprises a programmable logic controller (PLC).

10. The guide dresser of claim 1, wherein the automatic operation comprises one or both of:
    (i) slidable movement of the first cutter assembly and the second cutter assembly on the rail or slide system; and
    (ii) pivotal movement of each of the first cutter assembly and the second cutter assembly about a respective pivot component.

11. The guide dresser of claim 10, wherein each of the pivot components is a respective two-part pivotable block component, each of the two-part pivotal block components comprising a respective upper spherical plate and a respective lower spherical cup, each of the upper spherical plates being pivotably and slidably engaged with a corresponding one of the lower spherical cups.

12. The guide dresser of claim 10, wherein, when the guide dresser is in operation and a vertical positioning of the saw guide is skewed from a vertical direction, the pivot components automatically align the first and second rotatable cutter heads based on the measurement or measurements from the one or more laser range finders.

13. A method for automated milling of a saw guide, the method comprising:

providing the saw guide to the guide mount of the guide dresser of claim 1,
activating the one or more laser range finders to acquire the measurement or measurements of the saw guide;
triggering automated operation of the guide dresser to move the first cutter assembly and the second cutter assembly on the rail or slide system to engage the first cutter head of the first cutter assembly and the second cutter head of the second cutter assembly against opposing sides of the saw guide; and
milling or machining the saw guide to provide a milled saw guide.

14. The method of claim 13, wherein the step of activating the one or more laser range finders to acquire the measurements of the saw guide comprises two laser range finders each acquiring the respective measurement from an opposite side of the saw guide.

15. The method of claim 13, wherein the step of triggering automated operation of the guide dresser comprises a step of comparing the measurement or measurements acquired by the one or more laser range finders to stored information relating to laser range data, milling target size, number of Babbitt pads, orientation of the Babbitt pads, milling parameters, and milling thresholds for one or more different types of saw guides.

16. The method of claim 15, wherein the stored information was previously obtained and stored in a database during an initialization procedure, the initialization procedure comprising: mounting different saw guides to the guide mount, obtaining measurements from each side for each of the saw guides to provide the laser range data for each saw guide; correlating the obtained measurements to a set of parameters for each saw guide to provide a correlated dataset, and storing the correlated dataset as the stored information.

17. The method of claim 15, wherein the step of triggering automated operation of the guide dresser comprises a step of activating automated operation of the guide dresser based on an identity of the saw guide determined by the step of comparing the measurement or measurements acquired by the one or more laser range finders to the stored information.

18. The method of claim 15, wherein a programmable logic controller (PLC) uses the stored information to ensure a correct target size of the saw guide is milled.

19. The method of claim 13, further comprising a self-calibration procedure of measuring the milled saw guide; calculating a difference between a target size and a milled size; and adjusting milling parameters for subsequent operation.

20. The method of claim 13, wherein the entirety of the method, subsequent to providing the saw guide to the guide mount, is automated.

* * * * *